US007788123B1

(12) United States Patent
Ekhaus et al.

(10) Patent No.: US 7,788,123 B1
(45) Date of Patent: Aug. 31, 2010

(54) METHOD AND SYSTEM FOR HIGH PERFORMANCE MODEL-BASED PERSONALIZATION

(76) Inventors: Michael A. Ekhaus, 315 Washington Ave., Hopkins, MN (US) 55343; Robert Driskill, 5890 66th La. North, Greenfield, MN (US) 55357; Filip Mulier, 3774 Thomas Ct., Vadnais Heights, MN (US) 55127

( * ) Notice: Subject to any disclaimer, the term of this patent is extended or adjusted under 35 U.S.C. 154(b) by 1459 days.

(21) Appl. No.: 09/887,528

(22) Filed: Jun. 25, 2001

Related U.S. Application Data

(60) Provisional application No. 60/213,528, filed on Jun. 23, 2000.

(51) Int. Cl.
*G06Q 10/00* (2006.01)
(52) U.S. Cl. .......................................... 705/10
(58) Field of Classification Search ............... 705/10
See application file for complete search history.

(56) References Cited

U.S. PATENT DOCUMENTS

| 4,870,579 | A |   | 9/1989  | Hey              |
|-----------|---|---|---------|------------------|
| 4,996,642 | A |   | 2/1991  | Hey              |
| 5,023,833 | A | * | 6/1991  | Baum et al. ................. 365/49.1 |
| 5,091,852 | A |   | 2/1992  | Tsuchida et al.  |
| 5,668,987 | A |   | 9/1997  | Schneider        |
| 5,749,081 | A |   | 5/1998  | Whiteis          |
| 5,790,426 | A | * | 8/1998  | Robinson .................... 702/179 |
| 5,835,087 | A |   | 11/1998 | Herz et al.      |
| 5,872,850 | A |   | 2/1999  | Klein et al.     |
| 5,884,282 | A |   | 3/1999  | Robinson         |
| 5,893,909 | A |   | 4/1999  | Nomura et al. ................. 707/5 |
| 5,918,014 | A |   | 6/1999  | Robinson         |
| 5,959,574 | A | * | 9/1999  | Poore, Jr. ..................... 342/96 |
| 5,983,214 | A |   | 11/1999 | Lang et al.      |
| 6,006,218 | A |   | 12/1999 | Breese et al.    |
| 6,006,225 | A |   | 12/1999 | Bowman et al. ................ 707/5 |
| 6,016,475 | A |   | 1/2000  | Miller et al. .................... 705/1 |
| 6,018,738 | A |   | 1/2000  | Breese et al. ............... 707/100 |
| 6,041,311 | A |   | 3/2000  | Chislenke et al. |
| 6,049,777 | A | * | 4/2000  | Sheena et al. .................. 705/10 |

(Continued)

FOREIGN PATENT DOCUMENTS

CA     2249096 A1    3/2000

(Continued)

OTHER PUBLICATIONS

Schwinger, Julian. "The Geometry of Quantum States," Proceedings of the National Academy of Sciences of the United States of America, Feb. 15, 1960.*

(Continued)

*Primary Examiner*—Jonathan G Sterrett
(74) *Attorney, Agent, or Firm*—Sterne, Kessler, Goldstein & Fox P.L.L.C.

(57) ABSTRACT

The present invention relates to a method and system for generating client preference recommendations in a high performance computing regime. Accordingly, one embodiment of the present invention comprises: providing a sparse ratings matrix, forming a plurality of data structures representing the sparse ratings matrix, forming a runtime recommendation model from the plurality of data structures, determining a recommendation from the runtime recommendation model in response to a request from a user, and providing the recommendation to the user.

32 Claims, 10 Drawing Sheets

U.S. PATENT DOCUMENTS

| | | | |
|---|---|---|---|
| 6,064,980 | A | 5/2000 | Jacobi et al. |
| 6,092,049 | A | 7/2000 | Chislenko et al. |
| 6,108,493 | A | 8/2000 | Miller et al. |
| 6,112,186 | A * | 8/2000 | Bergh et al. ............... 705/10 |
| 6,266,649 | B1 | 7/2001 | Linden et al. |
| 6,313,745 | B1 | 11/2001 | Suzuki |
| 6,314,420 | B1 | 11/2001 | Lang et al. |
| 6,317,722 | B1 | 11/2001 | Jacobi et al. |
| 6,321,179 | B1 | 11/2001 | Glance et al. |
| 6,321,221 | B1 | 11/2001 | Bieganski |
| 6,334,127 | B1 | 12/2001 | Bieganski et al. |
| 6,356,889 | B1 | 3/2002 | Lohman et al. |
| 6,370,513 | B1 * | 4/2002 | Kolawa et al. ............ 705/10 |
| 6,412,012 | B1 | 6/2002 | Bieganski et al. |
| 6,415,368 | B1 | 7/2002 | Glance et al. |
| 6,434,550 | B1 | 8/2002 | Warner et al. |
| 6,438,579 | B1 * | 8/2002 | Hosken ................. 709/203 |
| 6,460,036 | B1 | 10/2002 | Herz |
| 6,606,624 | B1 * | 8/2003 | Goldberg ................. 707/6 |
| 6,636,836 | B1 | 10/2003 | Pyo |
| 2002/0065721 | A1 | 5/2002 | Lema et al. |
| 2002/0120609 | A1 | 8/2002 | Lang et al. |
| 2002/0199194 | A1 | 12/2002 | Ali |
| 2003/0191737 | A1 | 10/2003 | Steele et al. |
| 2004/0034652 | A1 | 2/2004 | Hofmann et al. |
| 2005/0091245 | A1 | 4/2005 | Chickering et al. |
| 2005/0125307 | A1 | 6/2005 | Hunt et al. |

FOREIGN PATENT DOCUMENTS

| | | |
|---|---|---|
| JP | 1-169605 | 7/1989 |
| JP | 7-152771 | 6/1995 |
| JP | 7-234881 | 9/1995 |
| JP | 8-331077 | 12/1996 |
| JP | 9-153027 | 6/1997 |
| JP | 9-265478 | 10/1997 |
| JP | 10-32797 | 2/1998 |
| JP | 10-63680 | 3/1998 |
| JP | 10-63681 | 3/1998 |
| JP | 10-63749 | 3/1998 |
| JP | 10-74206 | 3/1998 |
| JP | 10-91642 | 4/1998 |
| JP | 10-91647 | 4/1998 |
| JP | 10-91686 | 4/1998 |
| JP | 10-143540 | 5/1998 |
| JP | 10-143541 | 5/1998 |
| JP | 10-162025 | 6/1998 |
| JP | 10-162027 | 6/1998 |
| JP | 10-162028 | 6/1998 |
| JP | 10-198706 | 7/1998 |
| JP | 10-228482 | 8/1998 |
| JP | 10-228487 | 8/1998 |
| JP | 10-240749 | 9/1998 |
| JP | 10-247198 | 9/1998 |
| JP | 10-257405 | 9/1998 |
| JP | 10-260955 | 9/1998 |
| JP | 10-283403 | 10/1998 |
| JP | 10-289245 | 10/1998 |
| JP | 10-301950 | 11/1998 |
| JP | 10-307845 | 11/1998 |
| JP | 10-320415 | 12/1998 |
| JP | 10-340270 | 12/1998 |
| JP | 11-7453 | 1/1999 |
| JP | 11-7472 | 1/1999 |
| JP | 11-15840 | 1/1999 |
| JP | 11-45265 | 2/1999 |
| JP | 11-45284 | 2/1999 |
| JP | 11-45286 | 2/1999 |
| JP | 11-45289 | 2/1999 |
| JP | 11-45290 | 2/1999 |
| JP | 11-53394 | 2/1999 |
| JP | 11-66081 | 3/1999 |
| JP | 11-66097 | 3/1999 |
| JP | 11-66098 | 3/1999 |
| JP | 11-96164 | 4/1999 |
| JP | 11-110410 | 4/1999 |
| JP | 11-120189 | 4/1999 |
| JP | 11-134345 | 5/1999 |
| JP | 11-134361 | 5/1999 |
| JP | 11-143900 | 5/1999 |
| JP | 11-161670 | 6/1999 |
| JP | 11-164217 | 6/1999 |
| JP | 11-175546 | 7/1999 |
| JP | 11-184890 | 7/1999 |
| JP | 11-184891 | 7/1999 |
| JP | 11-195035 | 7/1999 |
| JP | 11-205706 | 7/1999 |
| JP | 11-212996 | 8/1999 |
| JP | 11-232278 | 8/1999 |
| JP | 11-232287 | 8/1999 |
| JP | 11-509019 | 8/1999 |
| JP | 11-250091 | 9/1999 |
| JP | 11-259497 | 9/1999 |
| JP | 11-272574 | 10/1999 |
| JP | 11-282874 | 10/1999 |
| JP | 11-282875 | 10/1999 |
| JP | 11-308547 | 11/1999 |
| JP | 11-312177 | 11/1999 |
| JP | 11-316759 | 11/1999 |
| JP | 11-328266 | 11/1999 |
| JP | 11-338869 | 12/1999 |
| JP | 11-338872 | 12/1999 |
| JP | 11-338879 | 12/1999 |
| JP | 11-345446 | 12/1999 |
| JP | 2000-13708 | 1/2000 |
| JP | 2000-23112 | 1/2000 |
| JP | 2000-48046 | 2/2000 |
| JP | 2000-57090 | 2/2000 |
| WO | WO 98/33135 A1 | 7/1998 |
| WO | WO 98/40832 A2 | 9/1998 |
| WO | WO 01/24032 A2 | 4/2001 |
| WO | WO 01/37162 A2 | 5/2001 |

OTHER PUBLICATIONS

Barbir et al. "Fast Structured Sparse Unary Matrix Operations on Dense Systolic Arrays," IEEE, 1991.*

Marcel et al. "Formal Choice Models in Marketing," Marketing Science, 1983.*

"Learning collaborative information filters" D Billsus, MJ Pazzani—Proceedings of the Fifteenth International Conference . . . , 1998—aaai.org.*

The sparse matrix manipulation system: User and reference manual FL Alvarado—URL address: http://www. cs. indiana. edu/ftp/ . . . , 1993—Citeseer.*

An efficient cluster identification algorithm. A Kusiak, WS Chow—IEEE transactions on systems, man, and cybernetics, 1987—hkbu.edu.hk.*

A framework for collaborative, content-based and demographic filtering-▶psu.edu [PDF] MJ Pazzani—Artificial Intelligence Review, 1999—Springer.*

Berry, M.W. et al., "Using Linear Algebra for Intelligent Information Retrieval," Computer Science Dept., CS-94-270, Dec. 1994, 24 pages.

Decision Innovations, www.decision-innovations.com, Jan. 28, 1999 [retrieved Feb. 11, 2005], pp. 1-22, retrieved from: google.com and archive.org.

Houstis, E.N. et al., "PYTHIA-II: A Knowledge/Database System for Managing Performance Data and Recommending Scientific Software," Dept. of Computer Sciences, Purdue Univ., 2000, 24 pages.

Jarke, M. and Koch, J., "Query Optimization in Database Systems," *ACM Computing Surveys*, vol. 16, No. 2, Jun. 1984, pp. 111-152.

Joshi, A. et al., "Robust Fuzzy Clustering Methods to Support Web Mining," Dept. of Computer Engineering and Computer Science, Univ. of Missouri, 1998, 9 pages.

Kautz, H. et al., "ReferralWeb: Combining Social Networks and Collaborative Filtering," *Communications of the ACM*, Mar. 1997, vol. 40, No. 3, 4 pages.

Maltz, D. et al., "Pointing the Way: Active Collaborative Filtering," *Proceedings of CHI '95*, Denver, Colorado, 1995, 8 pages.

McJones, P. and DeTreville, J., "Each to Each Programmer's Reference Manual," SRC Technical Note, 1997-023, Oct. 1, 1997, Systems Research Center, Palo Alto, CA, 16 pages.

"Movie critic" Internet address: http://www.moviecritic.com/faq.html, May 8, 2000, 6 pages.

Nasraoui, O. et al, "Mining Web Access Logs Using Relational Competitive Fuzzy Clustering," Computer Engineering and Computer Science, Univ. of Missouri, 1999, 5 pages.

Net Perception, Inc., www.netperceptions.com, Jan. 18, 1997 [retrieved Feb. 11, 2005], 31 pages, retrieved from: google.com and archive.org.

PRNewswire, "Net Perceptions and Shop at Home to Provide Personalized Product Recommendations for Shop At Home Customers," Jul. 19, 1999, 2 pages.

ProQuest, "GroupLens focuses on customers," InfoWorld, San Mateo, Mar. 9, 1998, vol. 20, Issue 10, 3 pages.

ProQuest, "Net Perceptions Celebrates New Triumphs at Internet World Spring; GroupLens 3.0 Debuts, N2K's Music Boulevard Goes Live," Business Wire, New York, Mar. 5, 1998, 2 pages.

Sarwar, B.M. et al., "Item-based Collaborative Filtering Recommendation Algorithms," Dept. of Computer Science and Engineering, Univ. of Minnesota, Minneapolis, MN,, Appears in WWW10, May 1-5, 2001, Hong Kong, 15 pages.

U.S. Appl. No. 60/155,437, filed Sep. 23, 1999, 18 pages.

www.amazon.com—Shows user recommendations, as archived Nov. 9, 2000, 2 pages.

www.moviecritic.com—Internet website, as archived Feb. 18, 1999, 1 page.

G. Karypis, "Suggest Top-N Recommendation Engine, Version 1.0," downloaded from <http://www-users.cs.umn.edu/~karypis/suggest/Files/manual.pdf> (Nov. 7, 2000, 11 pages).

G. Karypis, "Evaluation of Item-Based Top-N Recommendation Algorithms," downloaded from <https://wwws.cs.umn.edu/tech_reports/listing/tr2000/00-046.pdf>, University of Minnesota—Computer Science and Engineering, Technical report #00-046 (Sep. 15, 2000) (15 pages including Technical Report Abstract).

M. Hao, et al. "Visualization of Directed Association in E-Commerce Transaction Data," downloaded from <http://www.hpl.hp.com/techreports/2000/HPL-2000-160.pdf> (Hewlett-Packard Company, Dec. 5, 2000, 8 pages including cover page).

J.H. van Lint & R.M. Wilson, *A Course in Combinatorics* (second edition, Cambridge University Press, 2001).

C.D. Meyer, *Matrix Analysis and Applied Linear Algebra* (Society for Industrial and Applied Mathematics, 2000).

G. Salton et al., "Term-Weighting Approaches in Automatic Text Retrieval," Information Processing & Management, vol. 24, No. 5, pp. 513-523 (1988).

J. Swets, "Measuring the Accuracy of Diagnostic Systems," Science, vol. 240, pp. 1285-1293 (1988).

N. Belkin et al., "Information Filtering and Information Retrieval: Two Sides of the Same Coin?," Communications of the ACM, vol. 35, No. 12, pp. 29-38 (Dec. 1992).

D. Goldberg et al., "Using Collaborative Filtering to Weave an Information Tapestry," Communications of the ACM, vol. 35, No. 12, pp. 61-70 (Dec. 1992).

Maltz, D. "Distributing information for collaborative filtering on Usenet net news," Master's thesis, M.I.T. Department of EECS, Cambridge, Mass. May 1994.

P. Maes, "Agents that Reduce Work and Information Overload," Communications of the ACM, vol. 37, No. 7, pp. 31-40, 146 (1994).

P. Resnick et al., "GroupLens: An Open Architecture for Collaborative Filtering of Netnews," Proceedings of the 1994 Conference on Computer Supported Cooperative Work, pp. 175-186 (1994).

W.W. Cohen, "Fast Effective Rule Induction," in 12th Int. Conf. on Machine Learning, pp. 80-89, 1995.

W. Hill et al., "Recommending and Evaluating Choices in a Virtual Community of Use," Proceedings of the Computer-Human Interaction Conference, CHI '95 <http://www.acm.org/sigchi/chi95/proceedings/papers/wch_bdy.htm> (1995).

U. Shardanand, "Social Information Filtering: Algorithms for Automating 'Word of Mouth,'" Proceedings of the Computer-Human Interaction Conference, CHI '95, pp. 210-217 (May 1995).

W.W. Cohen, "Learning Rules that Classify E-Mail," in Papers from the AAAI Spring Symposium on Machine Learning in Information Access, pp. 18-25, Stanford, CA, 1996.

B. Miller, et al. "Experiences with GroupLens: Making Usenet useful again," [dated Jun. 18, 1996] also Proceedings of the 1997 Usenix Winter Technical Conference, (Jan. 1997).

P. Resnick, et al. "Recommender Systems," Communications of the ACM, vol. 40, No. 3, pp. 56-58 (Mar. 1997).

L. Terveen et al., "Phoaks: A System for Sharing Recommendations," Communications of the ACM, vol. 40, No. 3, pp. 59-62 (Mar. 1997).

M. Balabanovic et al., "Fab: Content-Based, Collaborative Recommendation," Communications of the ACM, vol. 40, No. 3, pp. 66-72 (Mar. 1997).

J.A. Konstan et al., "GroupLens: Applying Collaborative Filtering to Usenet News," Communications of the ACM, vol. 40, No. 3, pp. 77-87 (Mar. 1997).

H. Lieberman, "Autonomous Interface Agents," Proceedings of the Computer-Human Interaction Conference, CHI '97, pp. 67-74 (Mar. 1997).

R.Ferber, "Imagine: Interaction merger for associations gained by inspection of numerous exemplars" <http://teefix.fernuni-hagen.de/~ferber/imagine/imagine-info-engl.html> (4 pages-dated Dec. 15, 1997; printed Jan. 3, 2002).

C. Basu et al., "Recommendation as Classification: Using Social and Content-Based Information in Recommendation," Proceedings of the Annual Fifteenth National Conference on Artificial Intelligence (AAAI-98), Tenth Conference on Innovative Applications of Artificial Intelligence (IAAI-98), Learning About People, pp. 714-720.

G. Boone, "Concept Features in Re: Agent, An Intelligent Email Agent," Autonomous Agents 98, pp. 141-148.

B. Sarwar et al., "Using Filtering Agents to Improve Prediction Quality in the GroupLens Research Collaborative Filtering System," Proceedings of the 1998 Conference on Computer Supported Cooperative Work, pp. 345-354 (1998).

J. Breese et al., "Empirical Analysis of Predictive Algorithms for Collaborative Filtering," Technical Report MSR-TR-98-12, Microsoft Research, Microsoft Corporation, pp. 1-20, May 1998, revised Oct. 1998.

R.Ferber, "Imagine: Extracting knowledge from large collections" <http://teefix.fernuni-hagen.de/~ferber/imagine/> (2 pages-dated May 7, 1998; printed Jan. 3, 2002).

M. Johnson et al. "Direct E-mail: Winning Long-term Consumer Attention." Jupiter Communications Analyst Report Dec. 1998, pp. 1-26.

N. Good et al., "Combining Collaborative Filtering with Personal Agents for Better Recommendations," Proceedings of the 1999 Conference of the American Association of Artificial Intelligence (AAAI-99).

J. Herlocker, et al. "An Algorithmic Framework for Performing Collaborative Filtering," Proceedings of the 1999 Conference on Research and Development in Information Retrieval (Aug. 1999).

J.B. Schafer, et al. "Recommender Systems in E-Commerce," Proceedings of the ACM Conference on Electronic Commerce, Nov. 3-5, 1999.

R. O'Harrow Jr., "Private or Not?" Washington Post, May 17, 2000; G22 <http://www.washingtonpost.com/> (4 pages-dated May 17, 2000; printed Jun. 13, 2000).

"Net Perceptions Launches Comprehensive Hosted Marketing Service for eRetailers," Net Perceptions press release dated Jul. 12, 2000 <http://biz.yahoo.com/bw/000712/mn_net_per.html> (3 pages-dated Jul. 12, 2000; printed Jul. 12, 2000).

S. Stellin, "Internet Companies Learn How to Personalize Service," N.Y. Times, Aug. 28, 2000 <http://www.nytimes.com/library/tech/00/08/cyber/commerce/28commerce.html> (5 pages-dated Aug. 28, 2000; printed Aug. 28, 2000).

L.M. Rocha, "Adaptive Recommendation and Open-Ended Semiosis," Kybernetes, vol. 30, No. 5-6 (2001).

T. Long et al. "Beyond the Banner—the birth of email marketing," C.E. Unterberg, Towbin Report, pp. 1-72 (no date).

* cited by examiner

METHOD AND SYSTEM FOR HIGH PERFORMANCE MODEL-BASED PERSONALIZATION

RELATED APPLICATIONS

This application claims benefit of U.S. Provisional Application No. 60/213,528 entitled "High performance model-based personalization," by Ekhaus et al. filed on Jun. 23, 2000, the entire contents of which are hereby incorporated, and from which priority is claimed.

I. FIELD OF INVENTION

The present invention relates to the field of personalization systems. More particularly, the present invention relates to a method and system for generating client preference recommendations in a high performance computing regime.

II. BACKGROUND OF THE INVENTION

In a conventional transaction in which a client selects a good or service, the client generally has a set of preferences associated with a similar or dissimilar set of goods or services. In a mathematical sense, one can make a one-to-one correspondence between the set of preferences and the set of goods or services. For example, given the ordered set of goods or services:

{book "A1", film "A2", restaurant "A3", ..., music "A200"} where "A1-A200" denote, for example specific products or services, and given client "U", the ordered preferences may be expressed as for example Boolean quantities: U's preferences:

{book "A1": yes, film "A2": not yes, restaurant "A3": yes, ..., music "A200": yes} This may be expressed in the shorthand form, using "1" to denote "yes", "0" to denote "not yes", and "U" to denote "U's preferences" as a row vector containing 200 entries:

$U=\{1,0,1,\ldots,1\}$

Suppose that there is an additional item of interest: book "A201," of which U's Boolean preference is unknown: "0". Denoting book "A201" in the ordered set as one increment to the right, one may express this as:

$U=\{1,0,1,\ldots,1,0\}$

Suppose, further, that the following preferences for other clients, Z1-Z1000 are known and encompass book "A201":

$Z1=\{0, 1, 0, \ldots, 1, 1\}$ $Z2=\{1, 1, 1, \ldots, 0, 1\}$ $Z3=\{1, 1, 0, \ldots, 1, 0\}$

....

$Z1000=\{0, 0, 1, \ldots, 1, 1\}$

Personalization systems are generally designed in order to provide a robust recommendation for client U regarding item A201, based upon known preferences of client U as well as known preferences of other clients Z1-Z1000. The use of conventional personalization systems or recommendation systems in E-commerce is described in "Recommender Systems in E-Commerce," *Proceedings of the ACM Conference on Electronic Commerce*, Nov. 3-5, 1999, by Schafer et al.

One skilled in the art will appreciate that the utility of a recommendation system is driven by the method used for determining the amount of correlation that exists between the votes for two or more items, or by the amount of correlation that exists between the votes of two or more clients. There are a number of ways of determining correlation, for example, as discussed in "An Algorithmic Framework for Performing Collaborative Filtering," *Proceedings of the* 1999 *Conference on Research and Development in Information Retrieval*, August 1999, by Herlocker et al. Such methods include, for example the computation of Pearson correlations, as used in the GROUPLENS system, the calculation of Spearman rank correlation coefficients, or a least-squares comparison.

A basic problem with conventional recommendation systems, however, is directly related to the issue of combinatorial explosion. The volume of data collected from clients engaged in E-commerce is outpacing the conventionally applied computational ability to rapidly process such preferences and generate accurate recommendations. Although the introductory examples articulated in this document represent relatively trivial matrices (i.e. 201×201 matrices, or 1,000×1,000 matrices), in actual practice one must be able to work with matrices of the order of 1,000,000×1,000,000 and higher. In light of the foregoing, it remains desirable to introduce a system and method that can accurately process large ratings-matrices in a rapid fashion so as to generate accurate recommendations.

Another concern with conventional systems is related to the desire to preserve client data privacy. With such a large amount of data being processed for a given client, it is desirable for a system and method that will not allow one to reconstruct the original data set from the disclosed portion of the recommendation model.

III. SUMMARY OF THE INVENTION

Accordingly, in a first embodiment of the present invention, a method of providing a recommendation to a user comprises: providing a sparse ratings matrix, forming a plurality of data structures representing the sparse ratings matrix, forming a runtime recommendation model from the plurality of data structures, determining a recommendation from the runtime recommendation model in response to a request from a user, and providing the recommendation to the user.

In a second embodiment of the present invention, a method of providing a recommendation to a user comprises: providing a sparse ratings matrix, providing an update ratings data structure, forming a plurality of data structures representing the sparse ratings matrix, forming a runtime recommendation model from the plurality of data structures and the update ratings data structure, determining a recommendation from the runtime recommendation model in response to a request from a user, and providing the recommendation to the user.

In a third embodiment of the present invention, a method of providing a recommendation to a user comprises: providing a sparse ratings matrix, forming a plurality of data structures representing the sparse ratings matrix, forming a first recommendation model from said plurality of data structures, perturbing the first recommendation model to generate a runtime recommendation model, determining a recommendation from the runtime recommendation model in response to a request from a user, providing the recommendation to the user.

In a fourth embodiment of the present invention, a method of providing a recommendation to a user comprises: providing a sparse ratings matrix, forming a plurality of data structures representing the sparse ratings matrix, forming a first recommendation model from the plurality of data structures, truncating the first recommendation model to generate a runtime recommendation model, determining a recommendation from the runtime recommendation model in response to a request from a user, and providing the recommendation to the user.

In a fifth embodiment of the present invention, a method of providing a recommendation to a user comprises: providing a first ratings matrix, providing a second ratings matrix, forming a runtime recommendation model from the cross-set co-occurrences of the first ratings matrix and the second ratings matrix, determining a recommendation from the runtime recommendation model in response to a request from a user, and providing the recommendation to the user.

Further still, in a sixth embodiment of the present invention, a method of providing a recommendation to a user comprises determining a recommendation from a recommendation model using a multiplicity voting scheme, which may be personalized or may be anonymous.

Additional features and advantages of the invention will be set forth in the description that follows, and in part will be apparent from the description, or may be learned by practice of the invention. The objectives and other advantages of the invention will be realized and attained by the process and apparatus particularly pointed out in the written description and claims herein as well as the appended drawings.

IV. BRIEF DESCRIPTION OF DRAWINGS

The accompanying drawings, which are incorporated in and constitute a part of this specification, illustrate an implementation of the invention and, together with the description, serve to explain the advantages and principles of the invention. In the drawings, FIG. 1 depicts a recommendation scheme of the prior art in which a base model is not modified before generating a preference recommendation through an on-line or runtime model;

FIG. 2 depicts a recommendation scheme consistent with the present invention in which additional data allows the construction of a perturbed on-line model and generates a modified runtime recommendation model;

FIG. 3 schematically indicates exemplary relationships between various processes of the present invention and various helper functions in preferred embodiments;

V. DETAILED DESCRIPTION

Figure 1:
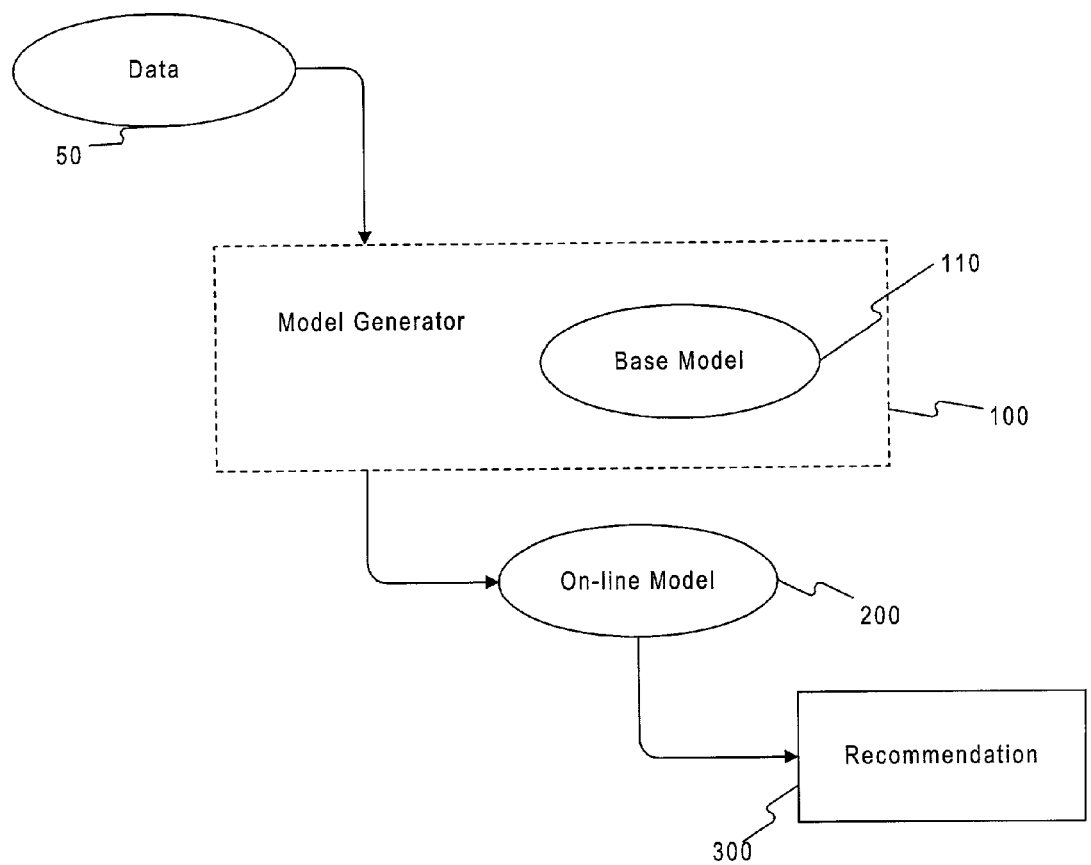

Reference will now be made in detail to an implementation consistent with the present invention as illustrated in the accompanying drawings. Whenever possible, the same reference number will be used throughout the drawings and the following description to refer to the same or like parts.

V.A. Term Definitions

As used herein, the symbol $\Re$ indicates a set. An array of the form $$R = \begin{pmatrix} r_{1,1} r_{1,2} r_{1,3} & \dots r_{1,m} \\ r_{2,1} r_{2,2} r_{2,3} & \dots r_{2,m} \\ \vdots & \vdots \\ r_{n,1} r_{n,q} r_{n,3} & \dots r_{n,m} \end{pmatrix}$$

with entries with values $r_{i,j} \in \Re$ is called an n×m matrix over $\Re$ with n rows and m columns. One skilled in the art should appreciate that the matrices in question are such that n and m are finite but not bounded. For example, new rows and columns are often added. This implies that calculations are preferably performed over infinite matrices with the property that all entries are zero except for those entries in a finite number of rows and columns.

As used herein, a row from a matrix, for example R, is a 1×m matrix. If i indicates the row in question, then $$(r_{i,1} r_{i,2} r_{i,3} \dots r_{i,m})$$

is the ith row of R. Similarly, as used herein, a column from a matrix is an m×1 matrix. If j indicates the column in question, then $$\begin{pmatrix} r_{1,j} \\ r_{2,j} \\ r_{3,j} \\ \vdots \\ r_{m,j} \end{pmatrix}$$

is the jth column of R.

As used herein, a vector is a 1×m or a n×1 matrix. The above statement regarding unbounded matrices applies to vectors as well. Accordingly, one skilled in the art should appreciate that definitions of operations are depicted over finite ranges for convenience only.

As used herein, rating indicates an entry of a "rating matrix," defined below. The presence of an entry is an indication that a relationship exists between a given client and a given item.

As used herein, a ratings matrix is a collection of numerical values indicating a relationship between a plurality of clients and a plurality of items. In general, and as indicated earlier, one may denote this as:

$$R = R_{u,i} = \begin{cases} 1 : \text{if client } u \text{ votes favorably for item } i \\ 0 : \text{otherwise} \end{cases}$$

where $u \in U$, the set of all clients, and $i \in I$, the set of all items. One skilled in the art should appreciate that "votes favorably" as used above may correspond to a variety of acts. For example, a favorable vote may correspond to client u purchasing item i, or it may correspond to client u literally expressing a favorable interest in item i. Again, item i itself is not limited to goods but may also correspond to services.

As used herein, the notation $A_{i,*}$ will denote the ith row of matrix A and $A_{*,j}$ will denote the jth column of A. Further still, it is useful to speak of vectors as if they were sets and vice-versa. One skilled in the art should be able to discern which is being referred to by the context of the operations performed. If one considers the set $$R_{*,j} \Leftrightarrow \{u \in U | R_{u,j} = 1\}$$

given any two items i and j∈I, then the set of clients having voted favorably for both items is given by:

$$R_{*,i} \cap R_{*,j} = \{u \in U | R_{u,i} = 1\} \cap \{u \in U | R_{u,j} = 1\}$$
$$= \{u \in U | R_{u,i} = 1, R_{u,j} = 1\}$$
$$= \{u \in U | R_{u,i} R_{u,j} = 1\}$$

Furthermore, if the cardinality of the set is taken, then the following is derived:

$$\#(R_{*,i} \cap R_{*,j}) = \sum_{u \in U} R_{u,i} R_{u,j} = \sum_{u \in U} R^t_{i,u} R_{u,j} = (R^t R)_{i,j}$$

The above relationship indicates that the dot product of the two columns from the ratings matrix is a sum over the number of co-rates between two items. Performing this for all possible pairs yields an item-item matrix of co-rates.

As used herein, an item-item model may be constructed by computing the matrix $_{(I-I)}M = R^t R$ where the superscript "t" indicates a transposed matrix, and the pre-subscript "(I-I)" on M indicates an item-item model. The item-item model indicates the correlation between two items for which preference ratings are known. The diagonal portion of $_{(I-I)}M$, for example the entry at row i and column i, corresponds to the total number of votes for item i. Furthermore, the number of clients having co-rated any item-item pair is given by the respective entries from the matrix $R^t R$.

Further still, given any two clients, the number of co-rated items between them is given by the respective entry of $RR^t$. Both symmetric forms are of interest to the types of problems that will be discussed herein.

Accordingly, and as used herein, a client-client model may be constructed by computing $_{(c-c)}M = R R^t$, where the pre-subscript "(c-c)" indicates "client-client." As before, the diagonal entries of the above matrix indicate how many favorable votes the corresponding client made.

As used herein, the item-item model $_{(I-I)}M$ and the client-client model $_{(c-c)}M$ will be denoted in general as M.

One skilled in the art should appreciate that, given a ratings matrix R, then $R^t R$ as well as $R R^t$ are symmetric as previously noted. For any given row of $R^t R$ or $R R^t$, the diagonal entry is the largest entry in the row. This is made apparent by considering that for each i, one has for all j that $$R_{*,i} \cap R_{*,j} \subseteq R_{*,i}$$

In addition, given any row i, the value of the diagonal term is the number of non-zero entries in the ith column of R. Therefore, given any column index, i, of R the ith row (or column) of $R^t R$ or $R R^t$ induces a relative scaling on all column indices of R. One may order the column indices according to this scaling, if it is decided how to order between indices that have the same relative ranking. One suitable manner is to decide uniformly between equivalently ranked indices of a row of $R^t R$ or $R R^t$.

As used herein, unary data indicates ratings data in which there are only two types of information: positive and no information. Such data sources are usually encoded with rating values of either zero or one. It is customary to let zero express no information since such use produces a sparse data set.

As used herein, interest data indicates ratings data in which there is a scaling to the positive interest of a rating. One skilled in the art should appreciate that the range of values is bounded such that each value is finite.

As used herein, liken data indicates ratings data in which there is a scaling that includes both positive interest and a degree of possible dislike.

As used herein, co-rate indicates either a co-rate of clients, or a co-rate of items. These two senses are analogous to each other. One skilled in the art should appreciate that two items are said to co-rate each other if and only if there exists a client that has rated both of these items. Therefore, it is permissible to have an item co-rate itself. Further still, two clients are said to co-rate each other if and only if there exists an item that both clients have rated.

V.B. Functional Definitions

The general process of generating a recommendation from a recommendation model consistent with embodiments of the present invention is discussed in this section. As used herein, the function Index(*) operating on a row of a matrix (a vector) sets the rows' co-rate with itself to zero. For example, given the row:

$$M_{i=12,*} = \{0,0,1,0,4,2,0,0,0,3,0,6,1,0,0,0\}$$

yields:

$$\text{Index}(M_{i=12,*}) = \{0,0,1,0,4,2,0,0,0,3,0,0,1,0,0,0\}$$

As used herein, the top-k co-rate for a row is denoted by $\text{Index}_k$. For example, if k=3

$$\text{Index}_{k=3}(M_{i=12,*}) = \{0,0,0,0,4,2,0,0,0,3,0,0,0,0,0,0\}$$

Notice that if one is interested in the top four co-rates, then a problem of breaking up ties would arise. This is a problem of a local degeneracy within a row. One may break this local degeneracy in a number of ways. For example, the global popularity of the items in question yield several approaches, two approaches of which are to select the most globally popular or the least globally popular. One skilled in the art should understand that when a top-k row vector is discussed, a method for breaking ties (or breaking such degeneracies) is implied.

As used herein, the operator that returns the top-k values is denoted by $\text{TOP}_k$. For k=3, one has $$\text{TOP}_{k=3}(M_{i=12,*}) = \{0,0,0,0,4,0,0,0,0,3,0,6,0,0,0,0\}$$

In general, the collection of methods covered by the M-model approach maps a row of M to a vector using a function of $\text{Index}_k(M_{i,*})$ and some statistics of M. This is usually done to scale the ranking induced by the co-rate matrix. This will be discussed in more detail later, but the most basic of operations is to set all the non-zero co-rates to 1. As used herein, this operation is denoted by Unary and in this example $$\text{Unary}(\text{Index}_{k=3}(M_{i=12,*})) = \{0,0,0,0,1,1,0,0,0,1,0,0,0,0,0,0\}$$

Because of its common use in the on-line recommendation, the above operation will be denoted herein in shortened form herein by $\text{Unary}_k(*)$. If any of these operators act on a matrix, it is defined herein to return a matrix in which the operator acts on each row of the input matrix.

As used herein, the diagonal operator, D, is an overloaded operator in the following sense: if D operates on square matrix then the return is a vector whose terms are from the diagonal of the respective matrix; alternatively if D operates on a vector then it returns a diagonal matrix whose non-zero diagonal entries correspond to the respective vector. For example, given a vector $\vec{v}$, D is defined herein by $$D(\vec{v}) = D(\vec{v})_{i,j} = \begin{cases} \left(\vec{1}^t \cdot \vec{v}\right)_{i,j} & : \text{if } i = j \\ 0 & : \text{otherwise} \end{cases}$$

where $\vec{1} = \{1, 1, 1, \ldots\}$ is a row vector of all 1's. Furthermore, given a square matrix A, then $$D(A) = D(A)_{1,i} = A_{i,i}$$

As used herein, a multiplicity voting recommendation scheme returning a maximum of k' elements from S and k-neighbors is given by $$\text{Unary\_Multi\_Vote}_{k'}(S, k) = TOP_{k'}\left(\sum_{i \in S}{}' \text{Unary}_k(M_{i,*})\right)$$

where the primed summation indicates a summation of the unique entries of S and where $S = \{X_1, X_2, \ldots, X_p\} \in XP$. As defined herein, the variable $X_m$ may represent an item when using the item-item model $_{(I-I)}M_{i,*}$, or it may represent a client when using the client-client model $_{(c-c)}M_{i,*}$.

As used herein, a non-unary version of this scheme may be expressed as $$\text{Multi\_Vote}_{k'}(S, k) = TOP_{k'}\left(\sum_{i \in S}{}' \text{Index}_k(M_{i,*})\right)$$

Suppose that $_{(I-I)}M = R^tR$ is a base model from which one constructs an on-line model, $_{(I-I)}M^{r(k)} = \text{Unary}_k(_{(I-I)}M)$. The derived model is computed so that $\text{Unary\_Multi\_Vote}_{k'}(*, k)$ may be computed more efficiently as $$\text{Unary\_Multi\_Vote}_{k'}(S, k) = TOP_{k'}\left(\sum_{X \in S}{}' \left(M_{i,*}^{r(k)}\right)\right)$$

where r(k) indicates the runtime model's dependence on the parameter k. This equation represents the unperturbed recommendation system using anonymous recommendations. For personalized recommendation one may use $$\text{Unary\_Multi\_Vote}_{k'}(R_{u,*}, k) \text{ where } u \in U$$

Suppose that there are multiple sources of ratings data. These different data sets may represent transactions other than purchases. For example, one set might be client purchases and another might be demographic data for these clients. As another example, the data may represent different divisions from a given company, different companies data, purchases in specified categories, etc. Therefore, suppose that one has a sequence of ratings matrices that represent different dimensions $$R^{(1)}, R^{(2)}, \ldots, R^{(p)}$$

and that these matrices represent data for a common set of clients. Specifically, suppose that the ith row of each matrix represents the same client. As used herein, a ratings matrix of augmented matrices comprises $$R^{(1)}, R^{(2)}, \ldots, R^{(p)}$$

$$\mathcal{R} = \{R^{(1)}, R^{(2)}, \ldots, R^{(p)}\}$$

Computing the matrix of co-rates between different dimensions as $\mathcal{R}^t\mathcal{R}$ gives a block matrix whose blocks are given by $$(\mathcal{R}^t\mathcal{R})_{block\ i,j} = (R^{(i)})^t R^{(j)}$$

Therefore, if one wants to know the top-k co-rated members from dimension j for dimension i, one determines $$\text{Unary}_k(R^{(i)})^t R^{(j)}$$

The case i=j is the case where there is one source of ratings data R described above. In this case $$\text{Unary}_k(R^tR) = M^{r(k)}$$

As used herein, the runtime model of co-rates between dimensions i and j is $$M(i,j)^{r(k)} = \text{Unary}_k((R^{(i)})^t R^{(j)})$$

In this situation, if a recommendation is from dimension i, then this recommendation, as used herein, is referred to as an i-recommendation. Furthermore, if dimensions i and j are both being considered for recommendations then it is referred to as {i,j}-recommendation, etc. Furthermore, i-ratings, as used herein, refer to the use of ratings data from dimension i as input. As an example, suppose one wants to make j-recommendations from i-ratings for client u. Extending the previously defined approach, this is given by $$\text{Unary\_Multi\_Vote}(i, j)_{k'}(R_{u,*}, k) = TOP_{k'}\left(\sum_{z \in R_{u,*}} (M(i, j)_{z,*}^{r(k)})\right)$$

VI. OVERVIEW OF THE PRESENT INVENTION

Data may be represented in a variety of forms and may correspond to a variety of items of interest. One of the objects of a recommendation model, however, is to draw out correlations in the data between items to aid profitability. The present invention, in a general sense, uses data to build a recommendation model that in order to provide personalized recommendations. In particular, the present invention, in one embodiment, involves constructing multiple recommendation models and from the collection of models, solving a particular client's problem. For example, recommendation models may be characterized as on-line (or runtime) and/or off-line. Further, the on-line recommendation model may be constructed from an off-line model. In certain instances, the off-line model may be better suited for batch processing of recommendations, because performance is less of an issue than that of the on-line equivalent. The usage scenario described below is an example of this situation.

Furthermore, even the off-line model may be only a portion of a larger model. One of the aspects of this approach is that a taxonomy of recommendations may be constructed using various models produced from data sources in an off-line manner. To be more precise, the various models are produced in a manner independent of their use in making personalized recommendations. In this manner, the runtime models are constructed as though in a memory cache in which data has been ordered and as much pre-computation as possible has occurred in anticipation of the final on-line calculations required at runtime.

In summary, it is beneficial to have a methodology that allows one to derive models from previously constructed models, and from which there can be incremental updates, thereby providing current and accurate knowledge of the data represented. These models, in turn, may be used in either an off-line or on-line fashion to construct recommendations. One skilled in the art should appreciate that one of the benefits of the present invention is the development of a consistent interpretation of correlated data as it relates to doing business across multiple interactions with a client. Additional data derived from such interactions may then be fed back into existing data, thereby allowing the process of model creation to incrementally update the collection of models to from the most up-to-date and accurate knowledge for both off-line and on-line (runtime) processing. The accuracy of such a collection of models is a measure of at least two aspirations: (i) firstly, the ability to correctly represent all data sources contributing to the models; and (ii) secondly, the ability to correctly represent the current (or runtime) intentions of the recommender (for example, the marketer or the reseller).

VI.A. Usage Scenario

For exemplary purposes only, suppose that a widget reseller has an Internet site or a call center at which clients may buy a plurality of widgets. Furthermore, the following information is considered known: (1) historical order data; (2) categorization of the widgets; and (3) profit margins for each widget Suppose that the widget reseller has a recommendation model, which provides client recommendations with respect to the plurality of widgets offered for sale. At some point in time, the widget reseller determines that a first widget is overstocked. Thus, the widget reseller needs to sell the first widget. Accordingly, and based on the updated information regarding the first widget, the widget reseller would like to: (i) determine likely previous clients to target, using, for example, direct mailing, e-mail, or the telephone; and (ii) if a client comes to the Internet site of the widget reseller and the reseller determines that the client is a strong candidate to buy a first widget, then widget reseller would like to detect this event and recommend a first widget to the client.

Accordingly, various embodiments of the present invention perform these two actions from a common framework while: (i) using the existing recommendation model for making recommendations as a base and deriving a modified model that represents the need to sell first widget; and (ii) changing the current working model for an on-line recommendation to reflect this need. That is to say, if the widget reseller would typically recommend a second widget under the base model, with the caveat that the second widget is part of a recommendation category in the base model that also contains the first widget, then the widget reseller may prefer to recommend the first widget in the modified recommendation model in place of the recommendation for second widget under the base model.

Furthermore, suppose that the profit margin for the first widget is median among the range of profit margins for other widgets that may be likewise recommended under a base model. In such an instance, and under a modified recommendation model, the widget reseller may want to replace a recommendation for all those widgets with a profit margin less than first widget with a recommendation for the first widget. Further still, the widget reseller may want to recommend the first widget in place of recommendations for widgets whose profit margin is higher than that of first widget, under a modified recommendation model. One skilled in the art should appreciate that this may be desirable in the case where one does not want to ignore high profit margins at the expense of removing an over stocked, lower profit margin widget.

FIG. 1 depicts a recommendation scheme of the prior art where a recommendation model is not modified to reflect additional data, such as where a given item, say a first widget, should preferably be recommended more often or less often.

Figure 2:
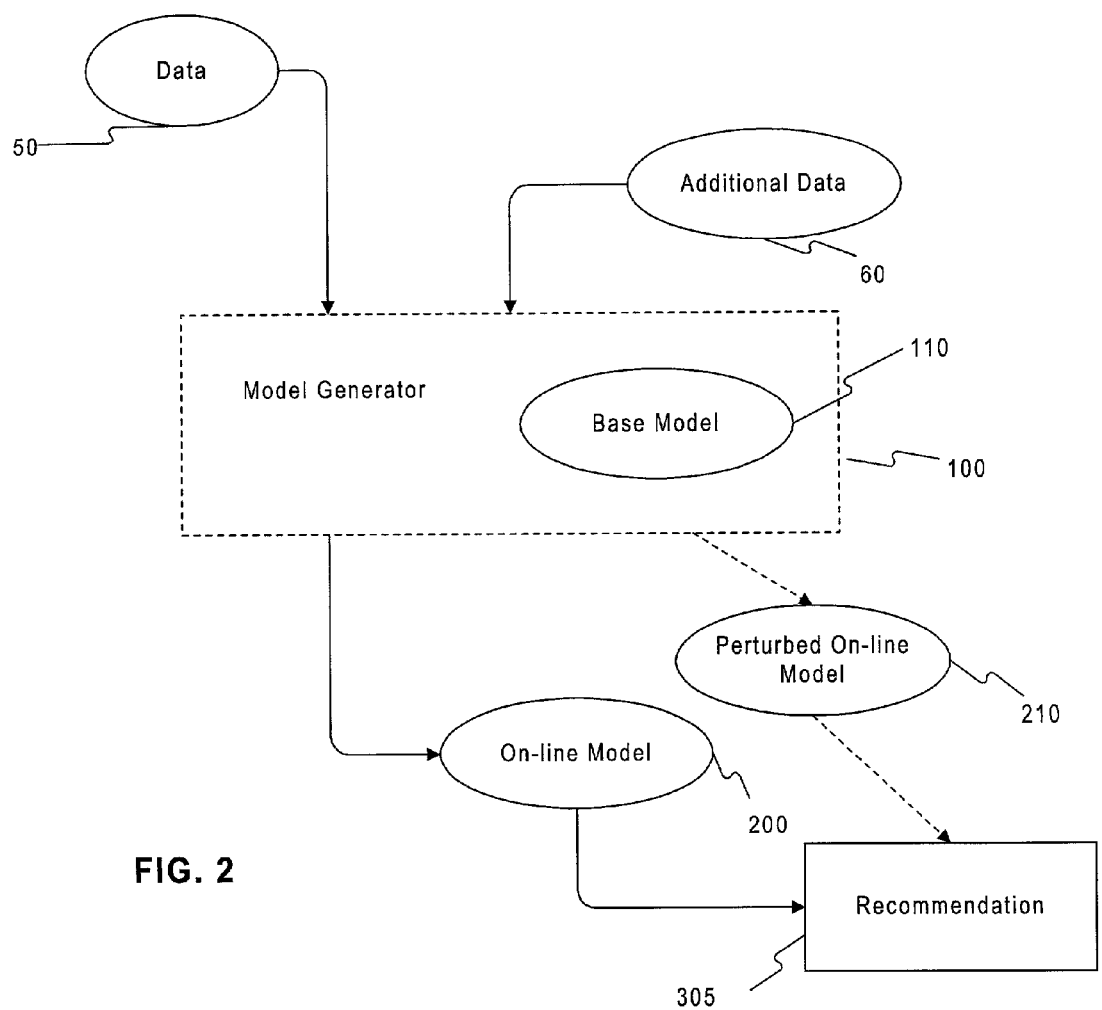

FIG. 2 depicts a modified situation consistent with the present invention where the dashed arrow schematically indicates the influence of additional data 60 as a result of introducing perturbed on-line model 210. Such a modification of base model 110, for example, uses additional data 60 to generate a marketing campaign for an item, say first widget, and perturbed on-line model 210 derived from the base model 110. As discussed in more detail below, one skilled in the art should appreciate that the perturbation may be undone at a time when it is decided to revert back to the base model. For example, at some time in the future (after the overstocked first widgets have been sold) the base model may be accepted as accurately reflecting ordinary, unperturbed buying patterns.

This above scenario is exemplary only, and is intended to illustrate one use of the described invention. Additionally, in the discussion that follows, one skilled in the art should appreciate that the examples disclosed herein are expressed as dense matrices and/or dense vectors for purposes of readability. However, the methods and systems disclosed herein relate generally to sparse matrices and/or sparse vectors.

Figure 3:
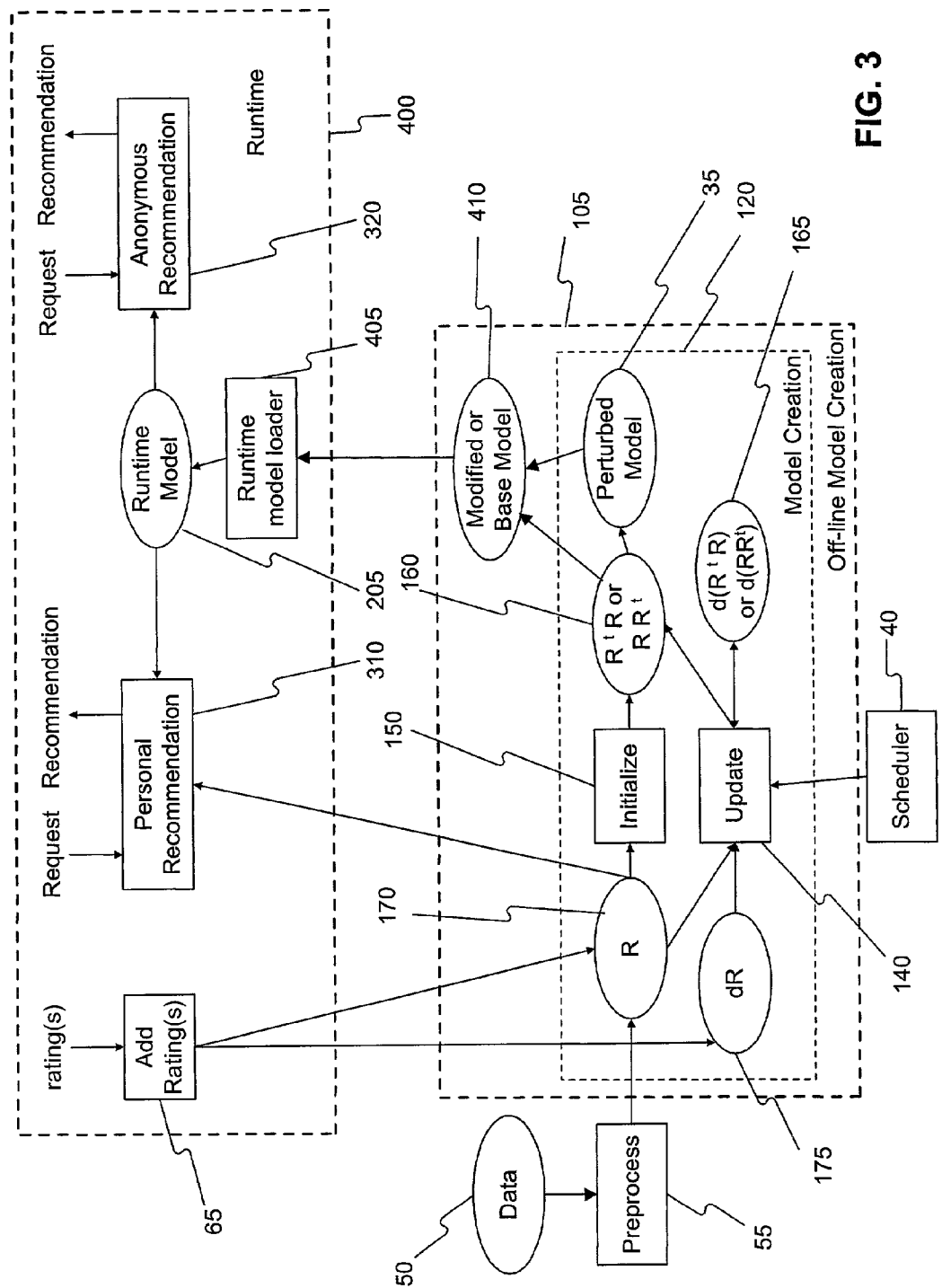

FIG. 3 indicates the relationship between the various processes consistent with the present invention. In particular, FIG. 3 is an exemplary schematic of the flow of data in an embodiment of the present invention, comprising the processes of: (1) preprocessing data 55; (2) scheduling 40; (3) loading a model 405; (4) adding rating(s) 65; (5) initializing 150; (6) updating 140; (7) perturbing model 35; (8) making a personalized recommendation 310; and (9) making an anonymous recommendation 320. FIG. 3 further illustrates the partitioning of off-line processing region 105 and runtime processing region 400.

Each of the above processes is described in more detail below. Items (1) through (4) above, in a preferred embodiment of the present invention, pertain to processing that assists the overall function of model creation. Items (5) through (9), on the other hand, constitute portions of embodiments of the present invention.

VI.B. Summary of Helper Processes

As described above, the helper processes comprise the steps of: preprocessing data; scheduling; loading a model; and adding ratings.

VI.B.1. Preprocessing Data

Client data may exist in a variety of possible formats, any one of which may not be directly usable by the system. Furthermore, there may be multiple data sources that collectively embody the "ratings data" or the "sparse ratings data." This data must be converted to a format that is suitable for the system, as indicated by preprocessing box 55 in FIG. 3, so that further processing steps may use this data in its compressed sparse representation. Section XII.C below discusses the general forms data may take in more detail.

VI.B.2. Scheduling

In a preferred embodiment of the present invention, scheduler 40, as indicated schematically in FIG. 3, is a functional unit of the present invention that enables processing to be initiated after which the instantiation of the system occurs.

VI.B.3. Loading a Model and Adding Rating(s)

Because of a separation between on-line model processing (or runtime processing) and off-line model processing in various embodiments of the present invention, one skilled in the art should appreciate the step of loading the runtime model used in on-line processing. This is indicated schematically by runtime model loader 405 in FIG. 3. Furthermore, the ability to add additional ratings to the models described by the present invention is incorporated in its design and is indicated schematically as add ratings box 65 in FIG. 3. In one preferred embodiment of the present invention, the additional ratings may originate as additional data from the on-line or runtime processing region 400. Furthermore, the arrow connecting ratings matrix data 170 and personal recommendation 310 indicates that, in certain instances, personal recommendations may be directly implemented from ratings matrix data 170.

Figure 4:
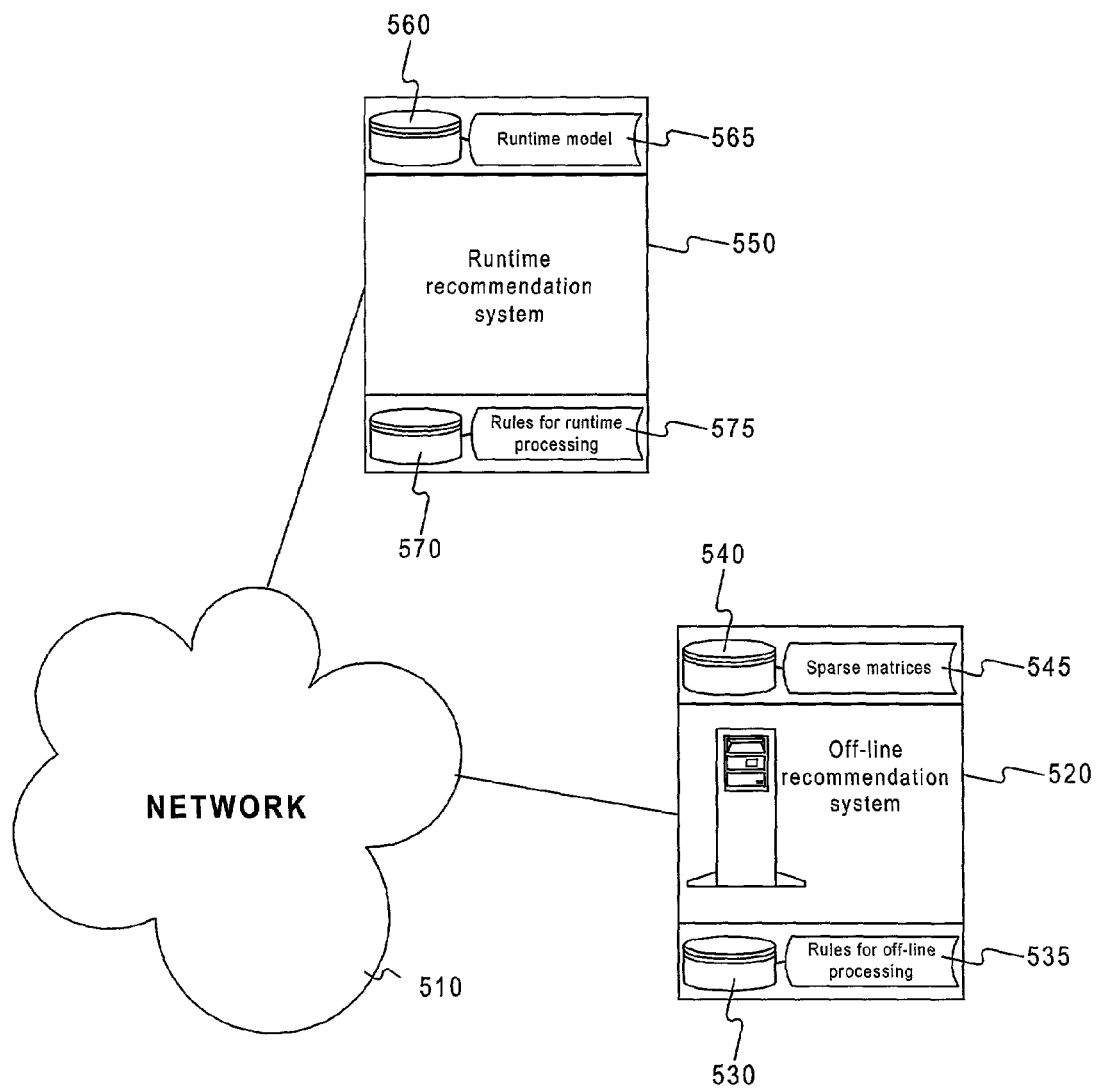
FIG. 4 depicts a system configuration consistent with the present invention in which a runtime recommendation system cooperates with an off-line recommendation system.

FIG. 4 depicts a system configuration consistent with the present invention in which runtime recommendation system 550 cooperates with off-line recommendation system 520 over network 510. Both runtime recommendation system 550 and off-line recommendation system 520 include processors as well as memory. In particular, off-line recommendation system 520 includes memory 540 for the storage of sparse matrix 545 information, and memory 530 for the storage of rules 535 for off-line processing. Likewise, runtime recommendation system 550 includes memory 560 for the storage of runtime model 560 and memory 570 for the storage of rules 575 for runtime processing. In a preferred embodiment runtime recommendation system 550 may form a portion of a data processing device with conventionally limited memory capabilities such as a personal digital assistant (PDA) or a mobile phone. In practice, however, one skilled in the art will appreciate that runtime recommendation system 550 may form a part of any data processing device such as a personal computer, workstation, or mainframe. Furthermore, the depiction of network 510 between runtime recommendation system 550 and off-line recommendation system 520 is exemplary only. That is, one skilled in the art should appreciate that runtime recommendation system 550 and off-line recommendation system 520 may form different processing and memory portions of the same data processing device.

VII. FIRST EMBODIMENT OF THE PRESENT INVENTION

Figure 5:
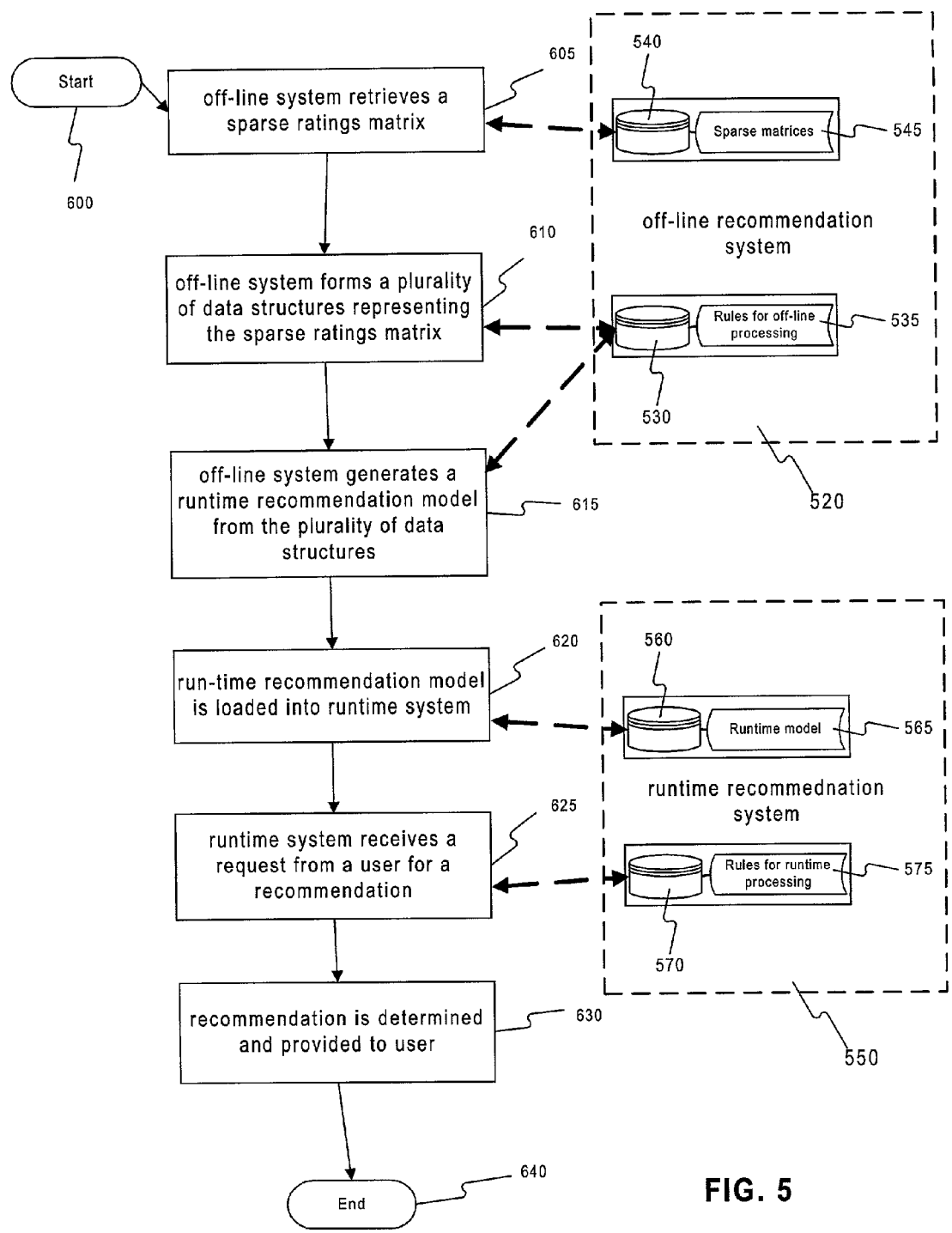
FIG. 5 is a schematic depiction of a method consistent with a first embodiment of the present invention.

In a first embodiment of the present invention, depicted schematically in FIG. 5, a method of providing a recommendation to a user comprises: providing a sparse ratings matrix, forming a plurality of data structures representing the sparse ratings matrix, forming a runtime recommendation model from the plurality of data structures, determining a recommendation from the runtime recommendation model in response to a request from a user, and providing the recommendation to the user.

In one example, discussed below, the plurality of data structures corresponds to the partitioning of a ratings matrix into a plurality of sub-space matrices, where one of the plurality of sub-space matrix is manipulated either singly or with a second sub-space matrix to produce a recommendation. For example, the plurality of sub-space ratings matrix may correspond to a plurality of categories. In FIG. 3, this is schematically depicted as initialize box 150, and in FIG. 5, this corresponds to step 610.

In general, step 605 of FIG. 5 includes retrieving or otherwise receiving data corresponding to a sparse ratings matrix. As mentioned above, step 610 initializes the sparse ratings matrix for further processing by forming a plurality of data structures representing the sparse ratings matrix.

In initializing sparse matrices of the present invention (step 610), the off-line model creation as described herein is based on computing the products $R^t R$ and $RR^t$. Below, it is shown that the task of model creation may be decomposed into constituent building blocks that are computed from matrix products.

VII.A. Categorical Data

As used herein, categories are mappings between dimensions. As previously discussed, the process of making recommendations for clients using one dimension's ratings for another dimension's recommendations concerned a situation in which there are ratings for both dimensions. Suppose that this is not the case, and that one only has ratings data for dimension i, but that one has a mapping between dimension i and j. For example, dimension j may represent categories for items contained in dimension i. Let this mapping, denoted by T, be given by $$T = T_{i,c} = \begin{cases} 1 : \text{if item } i \text{ is contained in category } c \\ 0 : \text{otherwise} \end{cases}$$

If matrix R is multiplied on the right by T, the resulting matrix may be considered a rating matrix of clients to categories. It is interesting to note that the scale should now be considered an interest scale as discussed in more detail below in Section XII.C.1, because higher valued entries denote that the respective client rated more items in this category than in category entries with lower values.

However, the discussion in this Section is concerned with the issue of mapping one's ability to make recommendations in one dimension to making recommendations in another in which there is no ratings data. For this, the model is defined by $$_{(I-I)}M = R^t \cdot R \cdot T$$

and one possible recommendation model is given by (step 615)

$$\text{Unary\_Multi\_Vote}(i, c)_{k'}(R_{u,*}, k) = \text{TOP}_{k'}\left( {}'\sum_{z \in R_{u,*}} {}_{(I-I)}M(i, c)_{z,*}^{r(k)} \right)$$

In this instance, T induces a ratings matrix for dimension c. This result suggests another approach for making recommendations in this case (step 630) by letting $$_{(I-I)}M = R^t \cdot \text{Unary}(R \cdot T)$$

in step 615.

VII.B. Distributed Modeling

In this section, the following temporal concepts are discussed: (1) Model Creation (MC): the point in time in which the model is created; (2) Runtime Model Creation (RMC): the point in time in which the runtime model is created; (3) Request Recommendation (RR): the point in time in which the recommendation is requested; and (4) Recommendation Process (RP) the point in time in which the recommendation is processed. From the above itemization of concepts, the "Recommendation Process" is essentially the final modification of the recommendation model (step 630). In a preferred embodiment of the present invention the temporal ordering among these four events is such that each event preferably occurs before the next may be considered for processing. However, such ordering is not a requirement of the present invention.

Further still, Personalization Identifiers (PI) are the key indicators that allow personalization to begin. Before the personalization identifiers are known, it is preferable to have as much model creation as is possible occur. After the PIs exist and a recommendation request occurs (at runtime), the final recommendation process may begin. In addition, Personalization Identification (PIndent) is the time at which the personalization identifiers have become known.

One aspect of these definitions is that in scenarios in which personalization identification occurs before the request for personalization, there is an opportunity for efficiently pre-calculating derived models that are customized to the fact that personalization identification has occurred. This provides an opportunity for extremely detailed personalization. In addition, the following list indicates areas in which distributed computed techniques may be involved: (i) parallel processing of model creation and various derived models; (ii) parallel processing of the recommendation process (i.e., the construction of the final recommendation); (iii) business-to-business model sharing; and (iv) efficient calculation of the entire model, together with distributing derived models to locations where the local recommendation are made. Specific implementations of distributed model creation and manipulation are discussed in detail below.

VII.C. Distributing Model Creation

As discussed earlier regarding ratings matrices based in different dimensions:

$$R^{(1)}, R^{(2)}, \ldots, R^{(p)}$$

formulas were presented that described the calculation required to compute both the complete co-rate model or the runtime co-rate models corresponding to either $R^t R$ or $RR^t$. Since the ratings matrix R may be banded or striped, as discussed below, the calculation from that section yields a manner in which to distribute the calculation of these models, as, for example, in step 615 of FIG. 5.

VII.C.1. Banding by Rows

Consider a partition of all clients for which there exists a item rating. Denote this partition as $B=(B_1, B_2, \ldots, B_k)$ and define the bands $$R_{u,j}^{(j)} = \begin{cases} R_{u,i} : \text{if } u \in B_j \\ 0 : \text{otherwise} \end{cases}$$

Since the bands are partitioning the rating by clients, it will be simple to derive a update formula directly. The result is a special case of a derivation provided below. Consider $$R = R^{(1)} + R^{(2)} + \ldots + R^{(k)}$$

where $R^{(j)}$ is defined above. The model is given by the following calculation $$R^t R = \left( \sum_{i=1}^{k} \sum_{j=1}^{k} (R^{(i)})^t \right) (R^{(j)})$$

Collecting terms and reordering the summations gives $$R^t R = \left( \sum_{i=1}^{k} \sum_{j=1}^{k} (R^{(i)})^t \right) (R^{(j)})$$

$$= \sum_{i=1}^{k} \left\{ (R^{(i)})^t R^{(i)} + \sum_{j: i < j \le k} \{R^{(i)}, R^{(j)}\} \right\}$$

where the internal summation is over terms that are all zero. Hence derivation reduces to $$R^t R = \sum_{i=1}^{k} \{(R^{(i)})^t R^{(i)}\}$$

This formula implies that, banded by clients, the co-rate model $R^t R$ may be distributed to multiple nodes of a computing cluster. Each node of such a cluster can compute its respective piece of the model. After any two nodes of such a cluster have computed their portion(s) of the model, communication to add the terms computed is permissible, etc. If there are $2^n$ bands of clients, the final model may be constructed with as few as n parallel steps, with a total of $2^n-1$ summations. Powers of two have been chosen for convenience. This will now be clarified by the following recursion formula. Let the base of the recursion be defined by $$_{(I-T)}M_j(0) = (R^{(i)})^t R^{(i)} \text{ where } j: 1 < j \le 2^n$$

the recursion is now given by $$_{(I-T)}M_j(k) = M_{2j-1}(k-1) + M_{2j}(k-1) \text{ where } j: 1 \le j \le 2^{n-k}$$
and $k: 1 \le k \le n$ When k=n, j can only take the value 1, at which point the recursion terminates and $$_{(I-T)}M_1(n) = R^t R$$

The distribution of the calculation is made easier due to the cross-band terms reducing to zero. In the next section this will not be the case.

VII.C.2. Striping by Columns

In this section, the ratings matrix will be striped by items instead of banded by clients. The motivation for this approach is to calculate extremely large data sets in which both $R^t R$ and $RR^t$ are to be calculated. Striping by items is preferred for the $R^t R$ case (and by client for the $RR^t$ case). In either case, striping as opposed to banding causes the cross-stripe terms be non-zero, requiring some discussion of distributing the calculation to combining intermediate results to calculate the final result. Many of the previous results still apply and will be the starting point for this discussion.

Consider that there are N blocks enumerated from 0 to N−1 as $B=(B_0, B_1, B_2, \ldots, B_{N-1})$ with the following definition:

$$R_{u,i}^{(j)} = \begin{cases} R_{u,i} : \text{if } i \in B_j \\ 0 : \text{otherwise} \end{cases}$$

Similar to Before, One has $$R = R^{(1)} + R^{(2)} + \ldots + R^{(N-1)}$$

By reorganizing the terms $$R^t R = \sum_{i=1}^{N-1} \left\{ (R^{(i)})^t R^{(i)} + \sum_{j: i < j \leq N-1} \{R^{(i)}, R^{(j)}\} \right\}$$

$$= \sum_{i=1}^{N-1} (R^{(i)})^t R^{(i)} + \sum_{i=1}^{N-1} \sum_{j: i < j \leq N-1} \{R^{(i)}, R^{(j)}\}$$

$$= \sum_{i=1}^{N-1} (R^{(i)})^t R^{(i)} + \sum_{(i,j): 0 \leq i < j \leq N-1} \{R^{(i)}, R^{(j)}\}$$

Therefore, one finds that the previous recursion applies to the first summation, which leaves distributing the second summation. Reordering the second summation yields $$\sum_{(i,j): 0 \leq i < j \leq N-1} \{R^{(i)}, R^{(j)}\} = \sum_{k=1}^{N-1} \sum_{\substack{0 \leq i, j \leq N-1 \\ j - i = k}} \{R^{(i)}, R^{(j)}\}$$

$$= \sum_{k=1}^{N-1} \sum_{i=0}^{N-k-1} \{R^{(i)}, R^{(i+k)}\}$$

$$= \sum_{k=1}^{N-1} \sum_{i=0}^{N-k-1} (i, i+k)$$

where $$(i, j) = \begin{cases} \{R^{(i)}, R^{(j)}\} : \text{if } i < j \\ \{R^{(i)}, R^{(j)}\} : \text{if } i > j \\ 0 : \text{otherwise} \end{cases}$$

In this summation, only the case $i<j$ is realized, but the notation will be useful in the next section. If the computing cluster has N nodes, and $R^{(i)}$ is stored on the ith node, then the above summation indicates which nodes communicate to complete the computation of the model.

VII.C.3. An Example of Distributed Model Creation Striped by Columns

Consider a four-node computing cluster for which there are 16 stripes required to represent R. Tables A1 and A2 indicate the distribution of work in the case of 16 nodes. In this scenario, half the of the nodes of the cluster are idle in eight stages.

TABLE A1

| Stage | Node 0 | node 1 | node 2 | node 3 | node 4 | node 5 | node 6 | node 7 |
|---|---|---|---|---|---|---|---|---|
| -1- | (0,1) | (1,2) | (2,3) | (3,4) | (4,5) | (5,6) | (6,7) | (7,8) |
| -2- | (0,2) | (1,3) | (2,4) | (3,5) | (4,6) | (5,7) | (6,8) | (7,9) |
| -3- | (0,3) | (1,4) | (2,5) | (3,6) | (4,7) | (5,8) | (6,9) | (7,10) |
| -4- | (0,4) | (1,5) | (2,6) | (3,7) | (4,8) | (5,9) | (6,10) | (7,11) |
| -5- | (0,5) | (1,6) | (2,7) | (3,8) | (4,9) | (5,10) | (6,11) | (7,12) |
| -6- | (0,6) | (1,7) | (2,8) | (3,9) | (4,10) | (5,11) | (6,12) | (7,13) |
| -7- | (0,7) | (1,8) | (2,9) | (3,10) | (4,11) | (5,12) | (6,13) | (7,14) |
| -8- | (0,8) | (1,9) | (2,10) | (3,11) | (4,12) | (5,13) | (6,14) | (7,15) |

TABLE A2

| Stage | node 8 | node 9 | node 10 | node 11 | node 12 | node 13 | node 14 | node 15 |
|---|---|---|---|---|---|---|---|---|
| -1- | (8,9) | (9,10) | (10,11) | (11,12) | (12,13) | (13,14) | (14,15) | (15,0) |
| -2- | (8,10) | (9,11) | (10,12) | (11,13) | (12,14) | (13,15) | (14,0) | (15,1) |
| -3- | (8,11) | (9,12) | (10,13) | (11,14) | (12,15) | (13,0) | (14,1) | (15,2) |
| -4- | (8,12) | (9,13) | (10,14) | (11,15) | (12,0) | (13,1) | (14,2) | (15,3) |
| -5- | (8,13) | (9,14) | (10,15) | (11,0) | (12,1) | (13,2) | (14,3) | (15,4) |
| -6- | (8,14) | (9,15) | (10,0) | (11,1) | (12,2) | (13,3) | (14,4) | (15,5) |
| -7- | (8,15) | (9,0) | (10,1) | (11,2) | (12,3) | (13,4) | (14,5) | (15,6) |
| -8- | No-Op | No-Op | No-Op | No-Op | No-Op | No-Op | No-Op | No-Op |

In the alternative, one may reorganize the terms to be calculated for computation on a four-node cluster as indicated below in Tables B1 and B2. Note, however, that the partitioning presented is not the only way to partition the calculation.

TABLE B1

| Stage | node 0 | node 1 | node 2 | node 3 |
|---|---|---|---|---|
| -1- | (0,1) | (1,2) | (2,3) | (3,4) |
| -2- | (0,2) | (1,3) | (2,4) | (3,5) |
| -3- | (0,3) | (1,4) | (2,5) | (3,6) |
| -4- | (0,4) | (1,5) | (2,6) | (3,7) |
| -5- | (0,5) | (1,6) | (2,7) | (3,8) |
| -6- | (0,6) | (1,7) | (2,8) | (3,9) |
| -7- | (0,7) | (1,8) | (2,9) | (3,10) |
| -8- | (0,8) | (1,9) | (2,10) | (3,11) |
| -9- | (8,9) | (9,10) | (10,11) | (11,12) |
| -10- | (8,10) | (9,11) | (10,12) | (11,13) |
| -11- | (8,11) | (9,12) | (10,13) | (11,14) |
| -12- | (8,12) | (9,13) | (10,14) | (11,15) |
| -13- | (8,13) | (9,14) | (10,15) | (11,0) |
| -14- | (8,14) | (9,15) | (10,0) | (11,1) |
| -15- | (8,15) | (9,0) | (10,1) | (11,2) |
| -16- | No-Op | No-Op | No-Op | No-Op |

TABLE B2

| stage | node 0 | node 1 | node 2 | node 3 |
|---|---|---|---|---|
| -17- | (4,5) | (5,6) | (6,7) | (7,8) |
| -18- | (4,6) | (5,7) | (6,8) | (7,9) |
| -19- | (4,7) | (5,8) | (6,9) | (7,10) |
| -20- | (4,8) | (5,9) | (6,10) | (7,11) |
| -21- | (4,9) | (5,10) | (6,11) | (7,12) |
| -22- | (4,10) | (5,11) | (6,12) | (7,13) |
| -23- | (4,11) | (5,12) | (6,13) | (7,14) |
| -24- | (4,12) | (5,13) | (6,14) | (7,15) |
| -25- | (12,13) | (13,14) | (14,15) | (15,0) |
| -26- | (12,14) | (13,15) | (14,0) | (15,1) |
| -27- | (12,15) | (13,0) | (14,1) | (15,2) |
| -28- | (12,0) | (13,1) | (14,2) | (15,3) |
| -29- | (12,1) | (13,2) | (14,3) | (15,4) |
| -30- | (12,2) | (13,3) | (14,4) | (15,5) |
| -31- | (12,3) | (13,4) | (14,5) | (15,6) |
| -32- | No-Op | No-Op | No-Op | No-Op |

Figure 6:
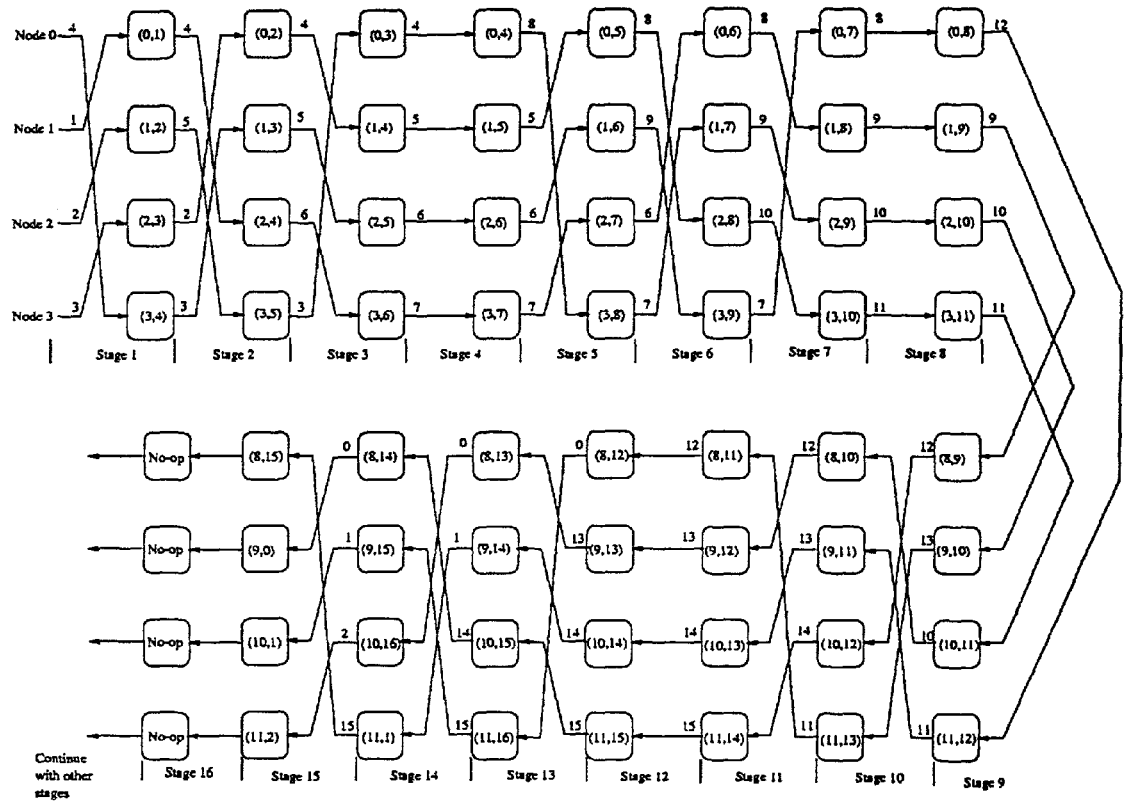
FIG. 6 depicts a conventional a node structure of the prior art in a distributed computing process.

FIG. 6 depicts a conventional node communication pattern. Within each box at a given stage the term being computed is indicated. The number at the tail of each arrow indicates the block being passed at that stage. FIG. 6 also indicates some general properties that are useful in characterizing the general case. In order to precisely describe the processing, one may make the following definitions. Let k denote the number of nodes in the computing cluster and N be the number of stripes of R such that 2k divides N. Defining the permutation matrix for the shift operator as $$(\Theta_{(k)})_{i,j} = \begin{cases} 1 : \text{if } j \geq i \quad j-i=1 \quad 0 \leq i, j \leq k-1 \\ 1 : \text{if } j < i \quad i-j=k-1 \quad 0 \leq i, j \leq k-1 \\ 0 : \text{otherwise} \end{cases}$$

the $n^{th}$ power of $\Theta_{(k)}$ is given by the following $$((\Theta_{(k)})^n)_{i,j} = \begin{cases} 1 : \text{if } j = (n \operatorname{Mod}_k + i) \operatorname{Mod}_k \quad 0 \leq i, j \leq k-1 \\ 0 : \text{otherwise} \end{cases}$$

In general, blocks being received by the nodes at stage n are given by $(\Theta_k)^n$ multiplied by a vector which characterizes the blocks sent at stage n. The block number that node i sends at stage n for a cluster size of k is denoted by Send_Block(n; i; k) and is given functionally by $$\text{Send\_Block}(n; i; k) =$$

$$\begin{cases} \left(\left(\left\lfloor \frac{(n-i-1)\operatorname{Mod}_N}{k} \right\rfloor + \left\lceil \frac{n}{N} \right\rceil\right) \cdot k + i\right) \operatorname{Mod}_N & : \text{if } 0 \neq n \operatorname{Mod}_N \geq i \\ \left\lfloor \frac{n}{N} \right\rfloor \cdot k + i & : \text{if } 0 \neq n \operatorname{Mod}_N < i \\ \varnothing & : 0 = n \operatorname{Mod}_N \end{cases}$$

The Received Bands are Characterized by

Received_Block(n;i;k)=$(\Theta_k)^n$Send_Block(n;i;k)

Note that the functional form of $(\Theta_{(k)})^n$ gives the communication required at stage n for each node of a computing cluster with k nodes. As such, the function Received_from(n; i; k) is defined by Received_from(n;i;k)=(n Mod$_k$+i)Mod$_k$ and reducing Received_Block(n; i; k) gives Received_Block(n;i;k)=Send_Block(n;Received_from (n;i;k);k)

$$\text{Current\_Block}(n; i; k) = \left\lfloor \frac{2((n-1)\operatorname{Mod}_N)}{N} \right\rfloor \cdot \frac{N}{2} + \left\lfloor \frac{n}{N} \right\rfloor \cdot k + i$$

Send_to(n;i;k)=(k−n Mod$_k$+i)Mod$_k$

Putting partial calculations together, it is now possible to express functionally the calculation at the $i^{th}$ node at the $n^{th}$ stage. In what follows, k and N are suppressed. Let $rb_i(n)$=Received_Block(n;i;k)

$cb_i(n)$=Current_Block(n;i;k)

$$\text{Current\_Block\_Matrix}(n:i) = (cb_i(n), rb_i(n))$$

$$= \begin{cases} \{R(cb_i(n)), R(rb_i(n))\} : \text{if } cb_i(n) < rb_i(n) \\ \{R(rb_i(n)), R(cb_i(n))\} : \text{if } cb_i(n) > rb_i(n) \\ 0 : \text{otherwise} \end{cases}$$

Accordingly, the process of distributing model creation is easily implemented consistent with the present invention.

VII.C.4. Distributed Computing for Recommendation Processing

It is also possible not to add all the pieces together and make recommendation directly from the nodes. That is, it is possible to have node i keep the portion of the runtime model for the items in $R^{(i)}$. In a preferred embodiment, each node must communicate with the other nodes to compute the proper portion of the model. This is given by $$M_{node_i} = \sum_{k=-i+1}^{2^n-i} (R^{(i)})^t R^{(i+k)}$$

The run-time distributed model (step 615) is given by $$M_{node_i}^{r(k)} = \text{Unary}_k(M_{node_i})$$

Furthermore, let S be a set of items from which a recommendation will be processed. If one partitions this set of items according to with nodes representing the items of S, then $S = \cup_{1 \leq i \leq 2^n} S_i$, where $S_i$ is the restriction of S to the $i^{th}$ node. Since the union is disjoint, the voting algorithm may be distributed according to the formula $$\text{Unary\_Multi\_Vote}_{k'}(S, k) = \text{TOP}_{k'}\left(\sum_{1 \leq j \leq 2^n} \sum_{i \in S_j}{}' \left(M_{node_j}^{r(k)}\right)_{i,*}\right)$$

Accordingly, the results from a combination of nodes may be efficiently processed consistent with the present invention.

VII.D. Business-to-Business Model Sharing

Next, one can consider either different divisions of a company or different companies that identify a common set of clients from which to build cross-company or cross-division co-rate models. This is straightforward given the method developed for parallel dimension and distributed computing above. The only issue is one of agreement on a set of clients.

VII.E. Mobilized Distributed Personalization

Having described the methods for calculating models in their entirety—by computing pieces of models and computing derived models—the next task focuses on distributing the model to localities at which recommendation processing will occur. Models may be distributed in their entirety if memory constraints permit. More to the point, by having pre-processed the models it is now feasible to distribute only portions of the model that are usable by a given set of personalization identifiers (i.e., a single client's ratings). It is shown below that a personalized model may be produced, thereby further personalizing the client's experience. In exactly the same fashion that a model may be partitioned for model creation and the recommendation process, a client's ratings may be partitioned according to categories.

Suppose that there are q categories. One may denote the list of categories as $C = (C_1, C_2, \ldots, C_q)$. Each $C_j$ is a list of items consisting of the members of the $j^{th}$ category. Since $C_j$ is a set of items, it may be considered a sparse vector with values of ones. As such $D(C_j)$ is the diagonal matrix with ones on the diagonal corresponding to the list $C_j$. Let (step 610)

$$R^C_j = R \cdot D(C_j)$$

The model for co-rating all items to category $C_j$ is given by (step 615)

$$M(C_j)^{r(k)} = \text{Unary}_k(R^t R^C_j)$$

where j runs over the list of categories C. Suppose that one wants to specialize these models to a client's rating. This may be useful because one is going to distribute the model. Consider starting with $D(R_{u,*})$, the diagonal matrix corresponding to client u's ratings. In a preferred embodiment, it will be customary to personalize the models $M^{r(k)}(C_j)$ to a client's ratings given by the non-zero rows of (step 615)

$$M^{u;r(k)}(C_j) = D(R_{u,*}) \cdot M^{r(k)}(C_j)$$

For example, suppose "restaurants" is a category, then a model for recommending restaurants from client u is given by $M_u^{u;r(k)}(C_{resturants})$. Since the personalized model is produced by multiplying by a sparse diagonal matrix, the number of non-zero rows in question should be significantly smaller than that of the respective model. As a result, the collection of personalized models across all categories may be a reasonably sized set. One may define the block matrix representing these derived models by $$M^{u;r(k)}(C) = \begin{pmatrix} M^{u;r(k)}(C_1) \\ M^{u;r(k)}(C_2) \\ \vdots \\ M^{u;r(k)}(C_q) \end{pmatrix}$$

One may also consider the matrix that characterizes a client's rating across the list of categories C denoted by $$R_u(C) = \begin{pmatrix} R_{u,*}|C_1 \\ R_{u,*}|C_2 \\ \vdots \\ R_{u,*}|C_q \end{pmatrix}$$

Although $R_u(C)$ and $M^{u;r(k)}(C)$ are somewhat complicated to express formally, in practice the amount of represented data is relatively small as compared to the entire model. These sets correspond to the personalized portions of the model with respect to client u and the category partitioning induced by C. Making j-recommendations from a unary multiplicity voting algorithm using client u's z-ratings may be given by $$\text{Unary\_Multi\_Vote}_{k'}(R_u(C)_z, k) = \text{TOP}_{k'}\left(\sum_{i \in R_u(C)_j}{}' M_{i,*}^{u;r(k)}(C_j)\right)$$

Of course, there are other meaningful expressions for making such recommendations if the co-rate values are taken into consideration. Furthermore, it is also consistent with the present invention to employ a client's entire set of ratings to make recommendations into a category, and if one of the categories is the entire item set then this will, in fact, be the case. This formulation enables recommendations to be made from a client's ratings in either a specific category or across categories. In all cases, if the client's personalization identities are known prior to the request for recommendation, the respective parts of the personalized model may be calculated and distributed to the location where the recommendations will be processed. This might be a desktop unit, cellular phone, personal digital assistant, digital assistant in a car, or some other device.

VII.E.1. A Scenario for Personalization Using Personal Digital Assistants

Further still, as an example, consider the following scenario. A person on a business trip carries a personal digital assistant (PDA). The PDA may or may not have Internet connectivity. If Internet connectivity is not present, then it is assumed that the person has some other means of Internet connectivity. Suppose that a database exists that contains this person's ratings for restaurants, theater, recreation, clothing, shopping, etc. It would be useful to make recommendations for any of these categories from this person's ratings of such categories. As an example, it makes no sense to recommend a restaurant in a different city. On the other hand, it is of utility to load derived models, such as those described in this section, directly into the clients PDA. This may be achieved by the PDA's direct Internet connectivity or by some other means. In either case, the models needed to make personalized recommendations for this client may be restricted to a memory allocation size to allow the entire footprint to fit into the PDA. In such a case, the algorithms of this and other sections are of a sufficiently simple nature that computation on the PDA is possible. If the PDA does in fact have connectivity, then an update of its internal models is possible on an ongoing basis. Otherwise, it could be updated out-of-band. Although out-of-band updating is less responsive than that of in-band updating, the rate at which added ratings will change the outcome of the recommendations is a minor effect in many scenarios. In this manner, a PDA could have the required runtime capability to make recommendations personalized to a client's ratings and derived personalized models. Thus, recommending breakfast in a particular city may be personalized depending on what one had for dinner the night before.

VIII. SECOND EMBODIMENT OF THE PRESENT INVENTION

Figure 7:
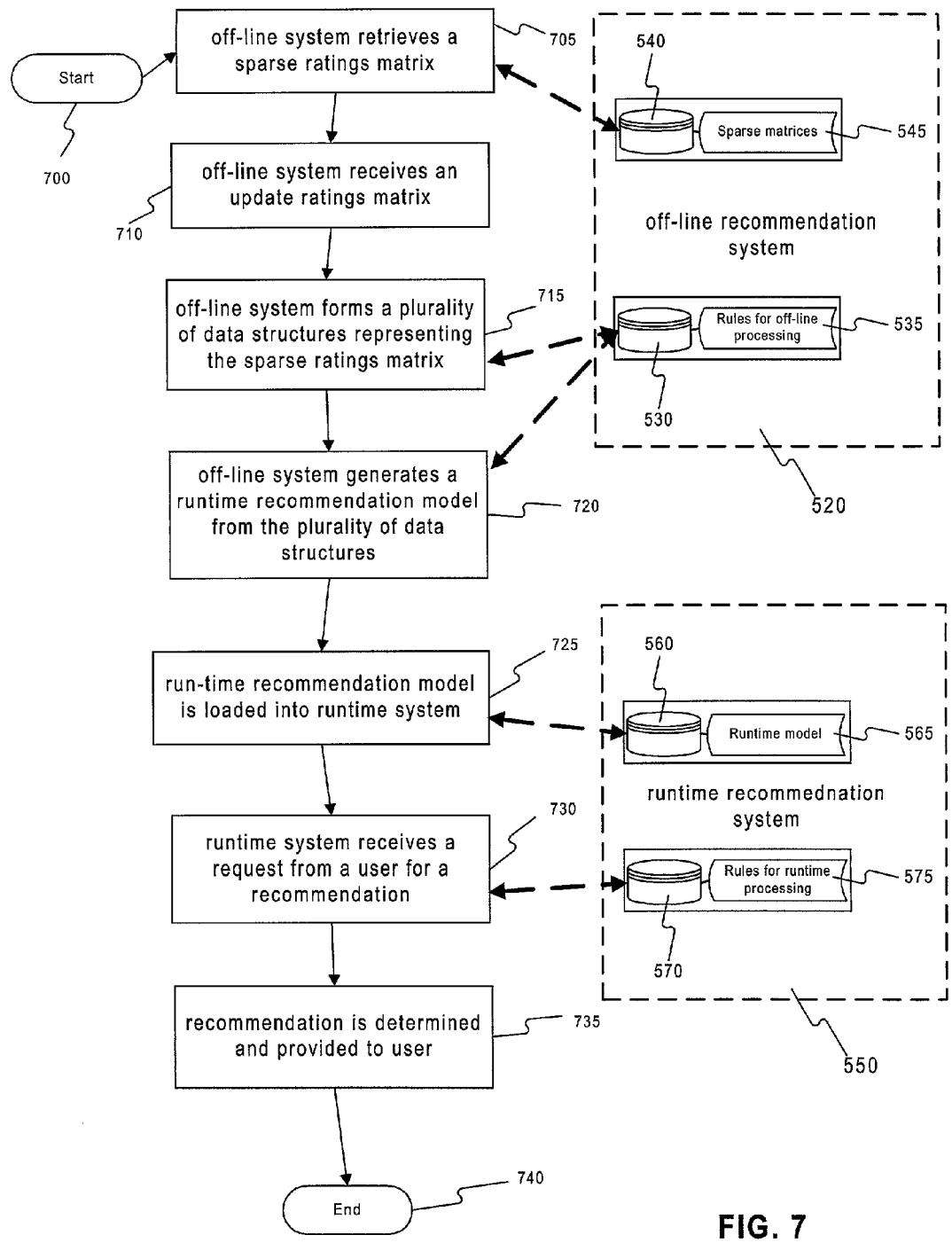
FIG. 7 is a schematic depiction of a method consistent with a second embodiment of the present invention.

In a second embodiment of the present invention, depicted in FIG. 7, a method for providing a recommendation to a client is based upon a model that is incrementally updated. Within FIG. 3, this corresponds to the process indicated by update box 140, and in FIG. 7 this corresponds to step 720.

A fresh model for on-line (or runtime) processing is required in order to make accurate recommendations. Whether the model is computed from scratch or the model is incrementally updated, the operations performed reduce to efficiently performing sparse matrix operations.

VIII.A. Incrementally Updating Model and Model Creation

Updating co-rates is a means by which a recommendation model is incrementally updated in a fashion analogous to the fundamental theorem of integral calculus. Specifically, and as discussed earlier, the model for making recommendations comes from the matrix of co-rated items $_{(I-I)}M = R^t R$. For now, consider that the number of items is fixed, resulting in $_{(I-I)}M$ being of fixed dimension. As time evolves, the matrix $_{(I-I)}M$ changes and it is natural to consider the matrix to be a function of time, denoted $_{(I-I)}M(t)$. Imagine that one could instantaneously compute the matrix of co-rated items. Clearly, this would be ideal. As new ratings arrive, the co-rate matrix jumps at the time of updating, first taking its initial value and then jumping to its next value, and so on. Note that the fixed number of items results in a model of bounded dimension. This is not general enough for the purposes of the present invention and as such the underlying state space for R should be extended to be infinite by infinite matrices indexed by the non-negative integers by the non-negative integers, with the property that only a finite number of clients and items have non-zero entries. For example, $R_{ui}$ is really a doubly indexed array, starting at zero for each of the independent coordinates. All that one is now allowing is that the arrays in question are finite and not of fixed dimension. The extension requires that our methods for update work independently of the number of clients and items. Since the multiplication of two matrices from our extended state space yields a matrix in the state space, the methods will function smoothly.

Note that in a time interval [0, T), there are only a finite number of jumps and therefore the jump sequence may be enumerated as $t_0 = 0 < t_1 < t_2 < t_3 < \ldots < t_n < T$. At any time in [0, T), the model's change is given by $$\delta[_{(I-I)}M(t)] = _{(I-I)}M(t) - _{(I-I)}M(t^-) = R^t(t)R(t) - R(t^-)R(t^-)$$

where $t^-$ indicates the use of a left limit. In other words, if there is a jump at time t, then $R(t^-)$ is the ratings matrix the moment just before the update occurred. If t is not in the jump sequence, then $\delta[_{(I-I)}M(t)]$ equals the matrix of all zeros. Since the jump times are discrete, then, for two consecutive jump times one, has the relationship $R(t_j) = R(t_{j+1}^-)$. This is nothing more than a restatement that R is constant between updates. Let time $T > 0$ be chosen and as above enumerate the times at which jumps occur. We can express the matrix of co-rates as a telescoping sum of incremental updates, given by, in general, (considering both $_{(I-I)}M(t)$ and $_{(c-c)}M(t)$)

$$M(T) = M(t_n) = (M(0) - M(0^-)) + (M(t^1) - M(t_1^-)) + \ldots + (M(t_n) - M(t_n^-))$$

As a reasonable convention, one may choose $M(0^-)$ to be the matrix of zeros. Letting $t_0 = 0$, $M(T)$ may be expressed in the following summation (step 720 of FIG. 7):

$$M(T) = \sum_{j=0}^{n} \delta M(t_j)$$

$$= M(t_0) + \sum_{j=1}^{n} \delta M(t_j)$$

$$= M(0) + \sum_{j=1}^{n} \delta M(t_j)$$

This expression is a discrete analogue to the Fundamental Theorem of Integral Calculus. Accordingly, one may return to $\delta[_{(I-I)}M(t)]$ and compute a product rule for the increment:

$$\delta[_{(I-I)}M(t)] = R^t(t)R(t) - R^t(t^-)R(t^-)$$
$$= R^t(t)R(t) - R^t(t)R(t^-) + R^t(t)R(t^-) - R^t(t^-)R(t^-)$$
$$= R^t(t)(R(t) - R(t^-)) + (R^t(t) - R^t(t^-))R(t^-)$$
$$= R^t(t)\delta R(t) + \delta R^t(t)R(t^-)$$
$$= R^t(t)\delta R(t) + [\delta R(t)]^t R(t^-)$$
$$= [R(t^-) + \delta R(t)]^t \delta R(t) + [\delta R(t)]^t R(t^-)$$
$$= [R(t^-)]^t \delta R(t) + [\delta R(t)]^t \delta R(t) + [\delta R(t)]^t R(t^-)$$
$$= [R(t^-)]^t \delta R(t) + [\delta R(t)]^t R(t^-) + [\delta R(t)]^t \delta R(t)$$
$$= [R(t^-)]^t \delta R(t) + [[R(t^-)]^t \delta R(t)]^t + [\delta R(t)]^t \delta R(t)$$
$$= R^t(t^-)\delta R(t) + [R^t(t^-)\delta R(t)]^t + [\delta R(t)]^t \delta R(t)$$

Note that $\delta[_{(I-I)}M(t)]$ is a symmetric matrix and only involves the values of $R(t^-)$ (the sparse matrix of step 705) and $\delta R(t)$ (the update ratings matrix of step 710). Although it appears that all of $R(t^-)$ is being used, this is not necessary. We only need to extract the client rows that can contribute to $\delta R(t^-)$.

Letting $\delta I$ denote the set of items that have changed ratings, one obtains (step 720)

$$R^t_{*,\delta I}(t^-)\delta R(t)+[R^t_{*,\delta I}(t^-)\delta R(t)]^t+[\delta R(t)]^t\delta R(t)$$

VIII.B. Directly Calculating the Runtime Model

In practice, the matrices $R^tR$ and $RR^t$ may become extremely large. It is preferable, therefore, to calculate the runtime models iteratively in a manner that allows one to truncate the model at intermediate steps of the calculation. It is also important to note that the approach described here works for both item co-rate models and client co-rate models. This gives the ability to efficiently calculate the top k client neighbors exactly.

VIII.B.1. Item-Based Models

One can consider a partition of all the items for which there exists a client rating. One may denote this partition as $B=(B_1, B_2, \ldots, B_k)$ and define (step 715)

$$R_{u,i}^{(j)} = \begin{cases} R_{u,i}: & \text{if } i \in B_j \\ 0: & \text{otherwise} \end{cases}$$

In a manner similar to that used in the parallel dimension model analysis, one may consider striping the rating matrix such that (step 715)

$$R=R^{(1)}+R^{(2)}+\ldots+R^{(k)}$$

where R(j) is defined above. The model is given by the following calculation (step 720)

$$R^tR = \left(\sum_{i=1}^{k}(R^{(i)})^t\right)\left(\sum_{j=1}^{k}(R^{(j)})\right)$$

Collecting terms and reordering the summations yields $$R^tR = \left(\sum_{i=1}^{k}\sum_{j=1}^{k}(R^{(i)})^t\right)(R^{(j)})$$

$$= \sum_{i=1}^{k}\left\{(R^{(i)})^tR^{(i)} + \sum_{j:i<j\leq k}(R^{(i)})^tR^{(j)} + (R^{(j)})^tR^{(i)}\right\}$$

$$= \sum_{i=1}^{k}\left\{(R^{(i)})^tR^{(i)} + \sum_{j:i<j\leq k}\{R^{(i)}, R^{(j)}\}\right\}$$

where the cross-dimensional terms are defined by $$\{R^{(i)},R^{(j)}\}=(R^{(i)})^tR^{(j)}+(R^{(j)})^tR^{(i)}$$

The runtime model (step 720) may be produced in a variety of ways. One way is to apply the unary operator $\text{Unary}_k$ as follows $$\text{Unary}_k(R^tR) = \sum_{i=1}^{k}\left\{\text{Unary}_k((R^{(i)})^tR^{(i)}) + \sum_{j:i<j\leq k}\text{Unary}_k(\{R^{(i)}, R^{(j)}\})\right\}$$

This yields an expression that enables iterative computation of an item-based model.

VIII.B.2. Client-Based Models

In many cases from real data, the matrix of co-rate clients is larger than the matrix of co-rated items and contains more non-zero entries. This results in not being able to store the entire model for co-rated clients, because of memory and storage constraints. In some cases, the same issue applies to the matrix of co-rated items. Hence it is important to be capable of computing the runtime versions of these models. The result of the previous section has a direct consequence to client-based models by replacing $R^t$ for R and noting that $(R^t)^t=R$. Doing so results in the following expression for the client co-rate matrix (step 720)

$$\text{Unary}_k(RR^t) = \sum_{i=1}^{k}\left\{\text{Unary}_k(R^{(i)}(R^{(i)})^t) + \sum_{j:i<j\leq k}\text{Unary}_k(\{(R^{(i)})^t, (R^{(j)})^t\})\right\}$$

The above expression and that of the previous section indicate that in spite of memory constraints, the runtime models for co-rates may be iteratively computed. Although doing so makes updates harder, it does not prevent them. In practice, it may be more efficient to re-compute in certain instances rather than computing the incremental update. In either case, the methods employed yield the ability to produce the runtime model directly from the calculation.

IX. THIRD AND FOURTH EMBODIMENTS OF THE PRESENT INVENTION

Figure 8:
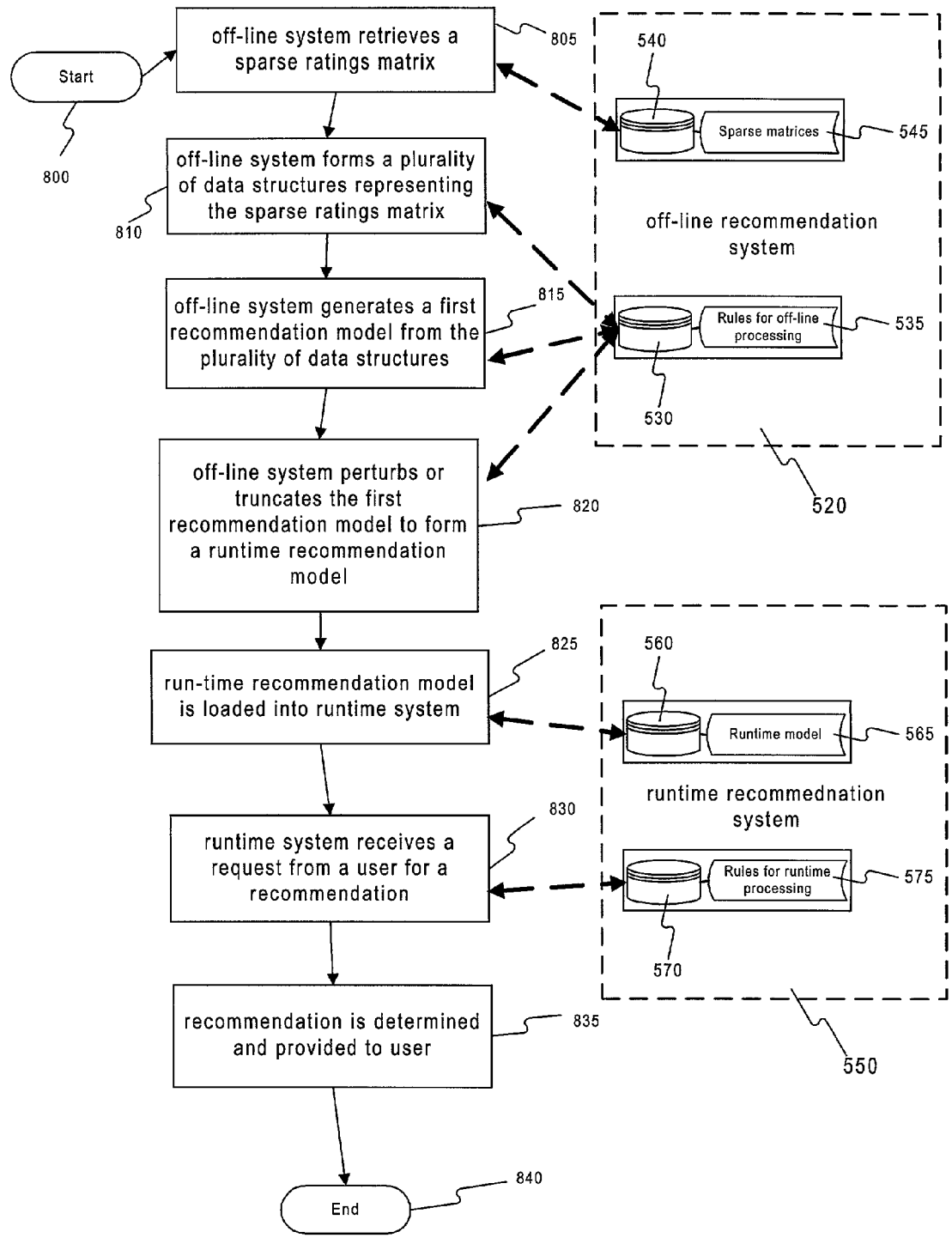
FIG. 8 is a schematic depiction of alternative methods consistent with a third or fourth embodiment of the present invention.

In a third and fourth embodiment of the present invention, depicted schematically in FIG. 8, a method for providing a recommendation to a client is based upon the ability to perturb a first model so as to generate a second model, or, alternatively based upon the truncation of a first model so as to generate a second model. This corresponds to perturbed model oval 35 as depicted in FIG. 3, or step 820 in FIG. 8. One skilled in the art should appreciate, however, that such a perturbing process may be implemented in a variety of regions in FIG. 3 consistent with the present invention. Accordingly, the methods for perturbing the models include truncation of the model for use in on-line or runtime processing, perturbations that favor a set of items, and functional scaling. All of the methods for perturbing the basic models are derived from either the mathematical structures being used or their internal representation as compressed row matrices.

IX.A. Example of a Skewed Recommendations

Suppose that one wants to calculate the perturbed recommendation system and an associated marketing campaign. Suppose that widget X is assumed to be in a category Y of widgets. One may wish to perturb the situation so that one is recommending widget X for all the widgets in this category that have profit margins less than that of X's. Let $S_X$ denote the set of widgets that X will replace. Assume that X replaces itself. In order to skew the recommendations, one may construct the following matrix:

$$C_{i,j} = \begin{cases} 1: & \text{if } i=j \notin S_X \\ 1: & \text{if } j=X\ i \in S_X \\ 0: & \text{otherwise} \end{cases}$$

Now one needs to compute the perturbed model for on-line recommendations. Two possible matrix products yield skewed models (step 820):

$$M'=\text{Unary}_k(M)\cdot C$$

or $$M'=\text{Unary}_k(M\cdot C)$$

The marketing campaign for widget X can work directly from M considering $$R \cdot (\text{Unary}(M_{X,*}))^t$$

as a ranking of clients who bought X's neighbors.

Consider further that one has a set of clients S and one wants to construct a recommendation of the top-k items for this set of clients. One possible recommendation is given by (step 835)

$$\text{Unary\_Multi\_Vote}_{top\_k}\left(\text{Unary}_q\left(\sum_{u \in U}{'} R_{u,*}\right), k'\_\text{neighbors}\right) \text{ where } u \in S$$

where the parameter q indicates that one is only using the top q items purchased by clients from S.

Further still, consider that one has a set of items S and one wants to construct a recommendation of the top-k clients for this set of items. This is a batch process situation. There are two situations to consider. First, a batch process that returns a ranking of clients for each item in the set S and second, a recommendation of clients for S entirely.

The first situation is a generalization of the situation presented in the simple scenario, given by $$R \cdot (\text{Unary}(M_{S,*}))^t$$

and the second is $$R \cdot \left(\text{Unary}\left(\sum_{i \in S}{'} M_{S,*}\right)\right)^t$$

One may introduce a q parameter by replacing the Unary operator with the $\text{Unary}_q$ operator. Furthermore, either the return vector needs to be sorted or one could only gather clients whose rank in the relative scaling is above a given threshold.

IX.B. Functional Scalings

The $\text{Unary}_k$ function is preferably used for the construction of the on-line models. Recall that, after this operator is applied, the non-zero entries of the resulting vector are equally weighted for use in constructing recommendations. For some data sets, this is fine, but for others, a relative scaling at the individual item neighborhood is relevant to the formation of the final recommendation. In some cases, one may find that instead of using $\text{Unary}_k$, the use of $\text{Index}_k$ is more suitable. It has also been useful to scale the individual entries by a weight corresponding to the diagonal terms from $R^t R$. (One skilled in the art should appreciate that the diagonal terms of $R^t R$ are the number of times that an item has been rated.)

Now it is possible to describe a second level of abstraction to making recommendations. Recall that a basic recommendation model used $M^{r(k)} = \text{Unary}_k(M)$. If one lets $\alpha \in (0,1]$, then we can scale the entries of M by the diagonal terms to the α root and then use the $\text{Unary}_k$ operator to construct $M^{r(k)}$. The functional form of this statement is given by (step 820)

$$M^{r(k)} = \text{Unary}_k(M \cdot [(D^2 M)^{-1}]^\alpha))$$

and the basic form of the recommendation remains unchanged as $$\text{Unary\_Multi\_Vote}_{k'}(S, k) = \text{TOP}_{k'}\left(\sum_{i \in S}{'} \left(M_{i,*}^{r(k)}\right)\right)$$

Next, one may let $f$ be a function defined on the positive real numbers with values in the positive real numbers. Furthermore, one may define the multiple-dimension function given by $F = (f, f, \ldots, f)$. That is $f$ acts on each coordinate where the dimension is determined by the context. In a preferred embodiment of the present invention, the functional scaling is of the form (step 820)

$$M^{r(k)} = \text{Unary}_k(M \cdot (F((D^2 M)^{-1})))$$

More generally, let $G = (g_{i,j})$ and let the recommendations be given by (step 820)

$$M^{r(k)} = \text{Unary}_k(M \cdot G(M))$$

Although this is not the most general functional form, this represents a preferred scaling.

X. FIFTH EMBODIMENT OF THE PRESENT INVENTION

Figure 9:
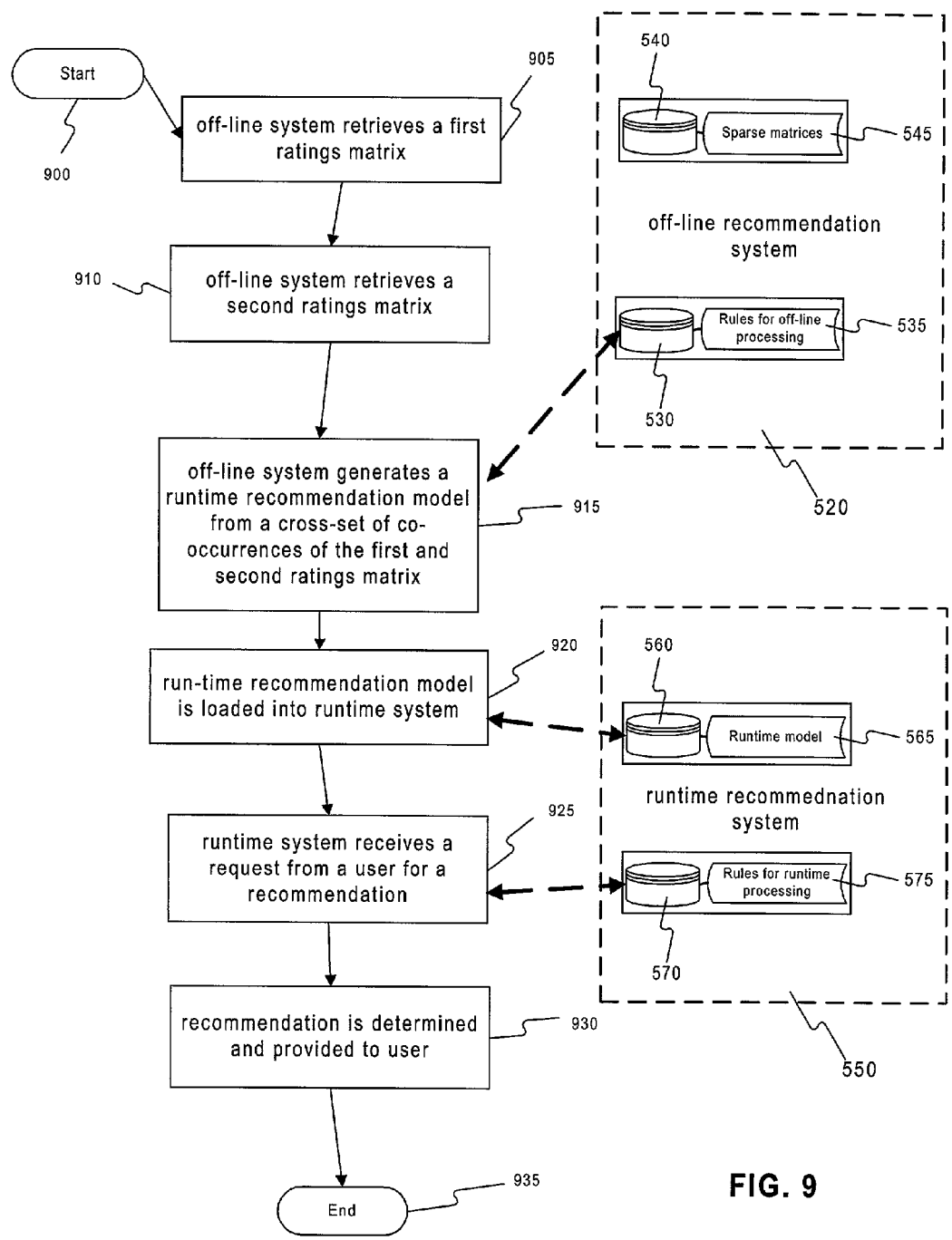
FIG. 9 is a schematic depiction of a method consistent with a fifth embodiment of the present invention.

In a fifth embodiment of the present invention, depicted in FIG. 9, a method for providing a recommendation to a client is based upon the construction of a model using cross-set co-occurrences (step 915).

For example, and considering the R-T-R oval 160 in FIG. 3, it may be that the left hand matrix represents a first category of data, and the right handed matrix represents a second category of data. In such a case, the model would then not be $R^t R$, a symmetric matrix, but rather $A^t B$, which in general, is not a symmetric matrix. Such a cross-set model allows for an entirely new basis for recommendations. The first and second matrices for the cross-set co-occurrences, as stated earlier, may be created at any stage of processing, such as sub-space matrices corresponding to particular categories or dimensions.

XI. SIXTH EMBODIMENT OF THE PRESENT INVENTION

Further still, in a sixth embodiment of the present invention, a method for providing a recommendation to a client is based upon the identification of a subset of items through a multiplicity voting scheme, which may be personalized or may be anonymous. This corresponds to, respectively, personal recommendation box 310 of FIG. 3 or anonymous recommendation box 320.

XI.A. Making Anonymous Recommendations

One of the purposes of the calculations is to construct a recommendation model with a desired property. A suitable set of models is constructed in a sequence of off-line processing stages. This separation of processing minimizes the runtime evaluation as described by the functions $\text{Unary\_Multi\_Vote}_{k'}$ (*, k) and $\text{Multi\_Vote}_{k'}(*, k)$ Of course, any additional processing of utility may be further applied. However, one focus of the present invention is to minimize the need for such runtime processing by suitably constructing the models such that minimal runtime processing is required. Note that the evaluation of Unary_Multi_Vote or Multi_Vote involves adding of vectors from a matrix that represents the on-line model.

XI.B. Making Personalized Recommendations

The making of a personalized recommendation is an application of anonymous recommendation, in which the system first constructs a list of items that are personalized and uses this list in the anonymous recommendation strategies.

XII. GENERALIZED ASPECTS OF THE PRESENT INVENTION

The remainder of the discussion herein will focus primarily on generalizations surrounding aspects of the invention as described in the preferred embodiment. In turn, these generalizations encompass the topics of filtering, high-order state spaces, and data properties. The topic of sparse matrix calculations is also briefly discussed.

XII.A. Generalized Filtering

Item Injection/Rejection

The issue of filtering may be done in many ways—one example is given in the usage scenario. In that case, a matrix was produced that had an effect on the manner in which the recommendations would be created. This type of an effect can be described as a scaling factor. This will be described formally in the next section.

XII.A.1. Scaling Factors

As an example, the type of scaling factor that was used in the simple usage scenario is described here. Recall that there was a rule to replace widget X for all widgets in $S_x$. This rule induces a $\{0,1\}$-valued function of the set $\{(i,j)|i,j \in I\}$. That is, a value of one if the rule holds between i and j, and a value of zero otherwise. Such functions directly give rise to matrices that may be used as scaling factors.

$$W = W_{i,j} = \begin{cases} 1: & \text{rule}(i, j) = 1 \\ 0: & \text{otherwise} \end{cases}$$

In fact, a matrix that encodes a usual scaling of items to items may be used as a scaling factor

XII.A.2. Item Rejection/Injection

As a direct consequence of producing a model, there are multiple places to perform item rejection or item injection. As described, recommendations can be made from a class of models. Entries in these models may be removed, rejected, or have their co-rate values modified in order to meet some rule-based policy to be enforced. As such, the need to perform such roles becomes less stringent at the runtime evaluation of the recommendations. Doing such modifications at the model level can be performed in either a reversible or irreversible manner. This is the choice of recommendation policy that the recommendation engine will enforce. Note that any such preprocessing of data does not rule out the possibility of runtime evaluation of rules that enforce the relevant portions of a runtime recommendation policy.

XII.B. Generalized High Order State Spaces

All of the previous examples discussed here dealt with, at most, integer-valued matrices. However, this does not have to be the case. There are three areas in which a more general model will be of immediate utility and are consistent with the present invention. These areas are the following: (i) "Not For Me:" a scenario in which clients of a web site indicate that an item should not be recommended to them, and amounts to incorporating negative feedback into the model based prediction algorithms; (ii) "Temporal Data:" where, in the descriptions of calculating the model, there has been no use of time; and (iii) "Windowing:" a scenario in which the model reflects data collected only after a certain data and one wants to maintain the model's accuracy as a running model.

All three of these scenarios have a common structure that is described below. One important aspect of this is the idea of pointing to a value of a entry of a matrix. That is, one can separate the reference of the (i,j)-entry of a matrix from the value. As a result, the value need not be integer-valued. Thus, this approach can be easily extended to support vector-valued matrices or some other useful structure. Described below are extensions in which the use of vector-valued matrices is both natural to consider and of utility.

XII.B.1. "Not for Me"

The notion of "not for me" is basically a three-state model for the values of a client's preference between any two items. In the initial formulation there were two states, rated both and no information. The reason the second state is referred to as no information is if a·b=0, then $\{a=0, b=1\}$, $\{a=1, b=0\}$, and $\{a=0, b=0\}$ are indistinguishable states of a and b. If it is desirable to distinguish between these states (gaining information) then one must extend the notion of a·b to take values in a larger state space. In the case of introducing "not for me" this is exactly what one wants to do.

One may consider a state space of zero-one-valued triples, $\{0, 1\}^3$, whose entries some to zero or one. There are only possibilities, $\Omega = \{(0, 0, 0); (1, 0, 0); (0, 1, 0); (0, 0, 1)\}$. We will allow our ratings to take values in $\Omega_{admissible} = \{(0, 0, 0); (0, 0, 1); (0, 1, 0)\}$. The value (1, 0, 0) will be reserved to indicate disagreement. A dictionary for these ratings values may be:

(0, 0, 0) indicates no information for the client. Of course, using sparse matrices, we do not store these values;

(0, 1, 0) indicates that the client rated the item favorably; and (0, 0, 1) indicates that the client rated the item "not for me."

The overload multiplication as defined by Table C:

TABLE C

|         | (0,0,0) | (0,1,0) | (0,0,1) | (1,0,0) |
|---------|---------|---------|---------|---------|
| (0,0,0) | (0,0,0) | (0,0,0) | (0,0,0) | —       |
| (0,1,0) | (0,0,0) | (0,1,0) | (1,0,0) | —       |
| (0,0,1) | (0,0,0) | (1,0,0) | (0,0,1) | —       |
| (1,0,0) | —       | —       | —       | —       | where the "—" indicates the non-admissibility of the ratings being "multiplied."

Summation of any two elements from $\Omega$ is performed coordinate wise. The following could equally have been defined over complex-valued matrices, but in practice the above description would be more practical. If R is a ratings matrix taking values in $\Omega_{admissible}$, the set of admissible states then $$R^t * R = (R^t * R)_{i,j} = \sum_u R^t_{i,u} * R_{u,j}$$

and defines our state matrix of co-rates.

Next is the issue of making recommendations. Previously, the approach was to take the top co-rated entries of a row vector. If one wishes to use only one coordinate from the state vector this scheme will still work, but this new situation is far more extensible than that simple situation. A possible scenario for distinguishing between state vectors is given as follows.

Let $\Psi=(\psi_1, \ldots, \psi_n)$ denote the state vector from $R^t*R$, in which $\Omega$ is the state space for ratings. Furthermore, let $f$ be an non-negative integer-valued function on $\Omega$. For example, we may want to define cut-off thresholds. In order to properly define such examples, consider the Heavyside function defined on the real values.

$$H(s-t) = \begin{cases} 1: & \text{if } s-t \geq 0 \\ 0: & \text{otherwise} \end{cases}$$

Now One can Discuss Functions Such as $$f^{k,k'}(\psi) = \psi_{(0,1,0)} H(k-\psi_{(0,1,0)}) H(k'-\psi_{(1,0,0)})$$

This function evaluates to the favorable co-rate value, ($\psi_{(0,1,0)}$), as long as the value the "not for me" and "disagreement" value are not above the cut-off values of k, k' respectively.

The above function is exemplary only, however, and in no way limits the present invention.

XII.B.2. Temporal Data

Further still, one can consider the problem of making the state time dependent. Recall that in Section VIII.A the incremental update for any change in the ratings was computed.

Suppose that S is defined to be real-valued pairs. The first entry stores the increment, and the second entry stores the timestamp indicating when the update occurred. Now rather than have a matrix that only indicates the co-rate value in its entries, one has a co-rate matrix whose entries are values in sequences in $S^\infty$ whose coordinates are all zero for sufficiently large indices, and which will encode that there have been only a finite number of updates in any time interval. The first entry will store the current value of the co-rate and the remaining entries of the sequence keep track of the incremental updates. In this manner the temporal nature of the co-rating matrix has been maintained.

XII.B.3. Windowing

Further still, in practice, the description of sequencing the incremental updates will become storage intensive and uninteresting. As a result of maintaining timestamps, it is possible to incrementally remove co-rate contributions that are too old. This may be performed at the time of an incremental update by checking whether there are any previous updates that are out of date. This is useful for item identifiers in the model that have been reused to represent similar items. One does not want to remove all the rating for the item, because then the start up problem exists. In this phasing of valid co-rates, we eventually have co-rates that represent the proper item in the real world (as opposed to this matrix representation of the world).

XII.C. Generalized Data Properties

Throughout the discussion presented here, unary data, as defined herein, has been the predominate data form. However, and in relation to the step of preprocessing data in a preferred embodiment, "Interest Data" and "Likert Data" are discussed briefly.

XII.C.1. Interest Data

The fundamental fact that makes $R^t R$ and $RR^t$ calculations possible is that if a, b, $\in \{0,1\}$ then ab=1 $\Leftrightarrow$ a=1 and b=1. Note that ab=min(a, b). If one considers the value "1" to mean interested in the item and the value "0" to mean no information, then the co-rate contribution of two entries makes sense as their minimum. Consider overloading the matrix multiplication operation (denoted with *):

$$A*B = (A*B)_{i,j} = \sum_u \min(A_{i,u}, B_{u,j})$$

All of the methods described are immediately extended to situations in which an overloaded multiplication operation is used. Note that if the rating data is in fact unary, this operation reduces to the unary algorithms describe elsewhere in this document. This fact has a direct consequence for the parallel dimensions algorithms. Suppose that one has three dimensions, one dimension of which is unary and two dimensions of which are interest. Recall that the cross dimension models were defined by $$M(i,j)^{r(k)} = \text{Unary}_k((R^{(i)})^t R^{(j)})$$

The cross dimension models may now be extended to $$M(i,j)^{r(k)} = \text{Unary}_k((R^{(i)})^t * R^{(j)})$$

Suppose that the j dimension is an interest dimension and i dimension is unary, then $$\text{Unary}_k((R^{(i)})^t * R^{(j)}) = \text{Unary}_k((R^{(i)})^t \text{Unary}(R^{(j)}))$$

This formula shows that in cross-dimension models involving a unary dimension, the model will reduce to the cross dimension model where the interest dimension in question has had a unary operator applied to make the data unary. This results in being able to deal seamlessly with multiple dimensions, mixed between interest and unary ratings.

XII.C.2. Likert-Binary Data

The approach to dealing with Likert data has been to make unary ratings data from the Likert data by using a binary cut-off. That is, values above a predefined threshold become one and otherwise zero. This threshold may be done on a client-to-client basis.

XIII. EXAMPLES OF SPARSE MATRIX CALCULATIONS

One aspect of the present invention has been the focus on the mathematical formulation for calculating co-occurrence in ratings data. The formulation disclosed used standard mathematical techniques in order to derive formulas that have utility for making fast, accurate recommendations. Since, most often, the data from which the recommender system will need to compute is extremely sparse in its matrix representation, it is further useful to turn attention towards some numerical analysis aspects. An example of a numerical analysis kit which may be used with the present invention is SPARSE-KIT2 (available from the University of Minnesota, Department of Computer Science and Engineering, Minneapolis, Minn., <ftp://ftp.cs.umn.edu/dept/sparse/>).

XIII.A. Compressed Sparse Row Format (CSR)

The matrices that have been discussed are such that the non-zero entries on a row represent a client's ratings. As such it is not surprising that one desires a representation for the computation that favors a viewpoint that is efficient for accessing the non-zero entries of a row. Such accesses are not the only operations that are required. Matrix multiplication is a fundamental operation and hence one will need this operation to be efficient. The compressed sparse row format, described below, is quite suitable for computation of the calculations discuss earlier. For a more thorough description of this and other formats the reader is directed to the documentation of the SPARSEKIT2 package.

The data structure used to represent a compressed sparse row formatted matrix consists of three arrays: (i) an array containing the non-zero entries of the matrix; (ii) an array containing the column positions of these non-zero entries; and (iii) an array containing pointers into the previous arrays corresponding to the beginning of each row of the matrix.

As an example, suppose that the matrix R in its standard representation is given by $$R = \begin{pmatrix} 0 & 1 & 0 & 0 & 1 \\ 1 & 0 & 1 & 1 & 0 \\ 0 & 0 & 0 & 0 & 1 \\ 1 & 0 & 0 & 0 & 1 \end{pmatrix}$$

Figure 10:
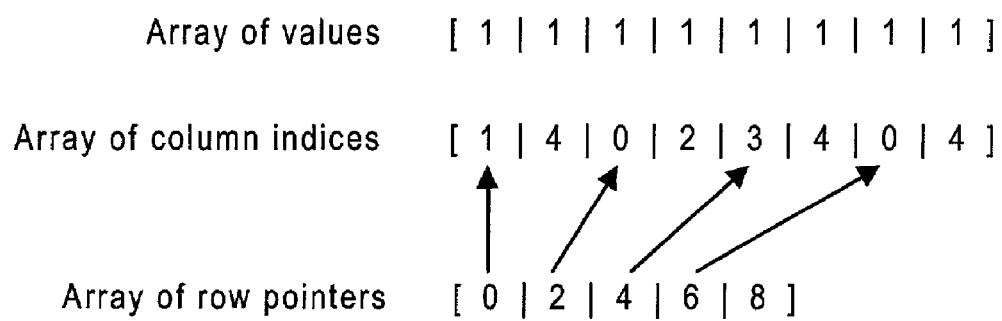
FIG. 10 depicts an example from the prior art of a transformation to compressed row format.

Consider that the following arrays are zero based. FIG. 10 shows three arrays that represent the matrix R in compressed-row format. Note that the last value of the array of row pointers is a reference to where the next row would begin if there were a next row. In essence, it encodes how many non-zero entries exist on the last row.

XIV. CONCLUSION

Methods and apparatus consistent with the present invention can be used to provide rapid, accurate, preference recommendations to a client. The foregoing description of an implementation of the invention has been presented for purposes of illustration and description. It is not exhaustive and does not limit the invention to the precise form disclosed. Modifications and variations are possible in light of the above teachings or may be acquired from practicing the invention. For example, although the runtime recommendation system and off-line recommendation system were depicted as separated by a network (wireless or otherwise), such a depiction was exemplary only. One skilled in the art should appreciate that runtime recommendation system and off-line recommendation system may form different processing and memory portions of the same data processing device. Accordingly, the invention is not limited to the above described embodiments, but instead is defined by the appended claims in light of their full scope of equivalents.

What is claimed is:

1. A method of preparing a user recommendation comprising:
   generating, in memory, a sparse unary ratings matrix from users' selected preferences, wherein each user's selected preferences are represented as unary data entries in said sparse unary ratings matrix, wherein each unary data entry has a value of either zero or one;
   forming in at least one data processing device a plurality of data structures representing said sparse unary ratings matrix, wherein the plurality of data structures includes a matrix of co-rates, and wherein the matrix of co-rates includes either a pre-multiplication of the sparse unary ratings matrix by a transpose of the sparse unary ratings matrix or a post-multiplication of the sparse unary ratings matrix by the transpose of the sparse unary ratings matrix;
   forming in the at least one data processing device a runtime recommendation model from said plurality of data structures;
   determining in the at least one data processing device a recommendation from said runtime recommendation model in response to a request for a recommendation; and
   providing said recommendation in response to said request.

2. The method of claim 1 further comprising calculating a unary multiplicity voting recommendation from said runtime recommendation model.

3. The method claim 1 further comprising calculating a non-unary multiplicity voting recommendation from said runtime recommendation model.

4. The method of claim 2 wherein said calculating a unary multiplicity voting recommendation comprises calculating an anonymous recommendation.

5. The method of claim 2 wherein said calculating a unary multiplicity voting recommendation comprises calculating a personalized recommendation.

6. The method of claim 3 wherein said calculating a non-unary multiplicity voting recommendation comprises calculating an anonymous recommendation.

7. The method of claim 3 wherein said calculating a non-unary multiplicity voting recommendation comprises calculating a personalized recommendation.

8. The method of claim 1,
   wherein said forming a runtime recommendation model from said plurality of data structures comprises:
   mapping said sparse unary ratings matrix into a plurality of sub-space ratings matrices, said mapping comprising multiplying said unary ratings matrices by a mappings matrix between said unary ratings matrices and a plurality of categories, and wherein each of said sub-space ratings matrices corresponds to one of said plurality of categories.

9. A method of preparing a user recommendation comprising:
   generating, in memory, a sparse unary ratings matrix including ratings data represented as unary data entries, wherein each unary data entry has a value of either zero or one;
   providing in a recommendation system including at least one data processing device an update ratings data structure;
   forming at the at least one data processing device a plurality of data structures representing said sparse unary ratings matrix, wherein the plurality of data structures includes a matrix of co-rates, and wherein the matrix of co-rates includes either a pre-multiplication of the sparse unary ratings matrix by a transpose of the sparse unary ratings matrix or a post-multiplication of the sparse unary ratings matrix by the transpose of the sparse unary ratings matrix;
   forming in the at least one data processing device a runtime recommendation model from said plurality of data structures and said update ratings data structure;
   determining at the recommendation system a recommendation from said runtime recommendation model in response to a request for a recommendation; and
   providing said recommendation in response to said request.

10. The method of claim 9 further comprising calculating a unary multiplicity voting recommendation from said runtime recommendation model.

11. The method of claim 9 further comprising calculating a non-unary multiplicity voting recommendation from said runtime recommendation model.

12. The method of claim 10 wherein said calculating a unary multiplicity voting recommendation comprises calculating an anonymous recommendation.

13. The method of claim 10 wherein said calculating a unary multiplicity voting recommendation comprises calculating a personalized recommendation.

14. The method of claim 11 wherein said calculating a non-unary multiplicity voting recommendation comprises calculating an anonymous recommendation.

15. The method of claim 11 wherein said calculating a non-unary multiplicity voting recommendation comprises calculating a personalized recommendation.

16. The method of claim 9, further comprising:
mapping said sparse unary ratings matrix into a plurality of sub-space ratings matrices, said mapping comprising multiplying said unary ratings matrices by a mapping matrix between said unary ratings matrices and a plurality of categories, and each of said sub-space ratings matrices corresponding to one of said plurality of categories.

17. The method of claim 1, wherein forming a runtime recommendation model from a plurality of data structures, comprises:
forming a first recommendation model from said plurality of data structures; and
perturbing said first recommendation model to generate a runtime recommendation model.

18. The method of claim 1, wherein forming a runtime recommendation model from a plurality of data structures, comprises:
forming a first recommendation model from said plurality of data structures;
truncating said first recommendation model to generate a runtime recommendation model.

19. A method of preparing a user recommendation, comprising:
receiving at a first recommendation system, including a data processing device, a runtime recommendation model from a second recommendation system, wherein the runtime model is formed from a plurality of data structures representing a unary array of ratings entries that can be arithmetically manipulated, wherein each unary data entry has a value of either zero or one, wherein a majority of the entries in the array are zero, wherein the plurality of data structures includes a matrix of co-rates, and wherein the matrix of co-rates includes either a pre-multiplication of the sparse unary ratings matrix by a transpose of the sparse unary ratings matrix or a post-multiplication of the sparse unary ratings matrix by the transpose of the sparse unary ratings matrix;
receiving at the first recommendation system a request for a recommendation;
generating in the data processing device of the first recommendation system a recommendation using the received runtime recommendation model; and
transmitting the recommendation.

20. The method of claim 19, wherein said generating a recommendation comprises:
calculating a unary multiplicity voting recommendation from the received runtime recommendation model; and
generating an anonymous recommendation.

21. The method of claim 19, wherein said generating a recommendation comprises:
calculating a unary multiplicity voting recommendation from the received runtime recommendation model; and
generating a personalized recommendation.

22. The method of claim 19, wherein said generating a recommendation comprises:
calculating a non-unary multiplicity voting recommendation from the received runtime recommendation model; and
generating an anonymous recommendation.

23. The method of claim 19, wherein said generating a recommendation comprises:
calculating a non-unary multiplicity voting recommendation from the received runtime recommendation model; and
generating a personalized recommendation.

24. A method for generating a runtime recommendation model comprising:
retrieving at a first recommendation system, including a data processing device, a unary array of ratings entries that can be arithmetically manipulated, wherein data in the unary array of ratings entries is unary data, wherein each unary data entry has a value of either zero or one, and wherein a majority of the entries in the array are zero;
receiving at the first recommendation system an update to the unary array of ratings entries;
generating in the data processing device of the first recommendation system the runtime recommendation model from a plurality of data structures representing the unary array of ratings entries, wherein the plurality of data structures includes a matrix of co-rates, and wherein the matrix of co-rates includes either a pre-multiplication of the sparse unary ratings matrix by a transpose of the sparse unary ratings matrix or a post-multiplication of the sparse unary ratings matrix by the transpose of the sparse unary ratings matrix; and
providing the runtime recommendation model from the first recommendation system to a second recommendation system, wherein the second recommendation system generates a recommendation using the runtime recommendation model.

25. A data processing device, comprising:
a processor configured to generate in memory a sparse unary ratings matrix from users' selected preferences, wherein each user's selected preferences are represented as unary data entries in said sparse unary ratings matrix, wherein each unary data entry has a value of either zero or one;
wherein the processor is configured to form a plurality of data structures representing said sparse unary ratings matrix, wherein the plurality of data structures includes a matrix of co-rates, and wherein the matrix of co-rates includes either a pre-multiplication of the sparse unary ratings matrix by a transpose of the sparse unary ratings matrix or a post-multiplication of the sparse unary ratings matrix by the transpose of the sparse unary ratings matrix;
wherein the processor is configured to store said plurality of data structures in the memory;
wherein the processor is configured to form a runtime recommendation model from said plurality of data structures; and
wherein the processor is configured to determine a recommendation from said runtime recommendation model in response to a request for a recommendation.

26. A data processing device comprising:
   means for generating in memory a sparse unary ratings matrix from users' selected preferences, wherein each user's selected preferences are represented as unary data entries in said sparse unary ratings matrix, wherein each unary data entry has a value of either zero or one, and wherein a majority of the entries in said sparse unary ratings matrix are zero;
   means for forming a plurality of data structures representing said sparse unary ratings matrix, wherein the plurality of data structures includes a matrix of co-rates, and wherein the matrix of co-rates includes either a pre-multiplication of the sparse unary ratings matrix by a transpose of the sparse unary ratings matrix or a post-multiplication of the sparse unary ratings matrix by the transpose of the sparse unary ratings matrix;
   means for storing said plurality of data structures in the memory;
   means for forming a runtime recommendation model from said plurality of data structures; and
   means for determining a recommendation from said runtime recommendation model in response to a request for a recommendation.

27. An article of manufacture including a computer-readable storage medium having stored thereon computer-executable instructions, execution of which by a processing device, causes the processing device to perform operations comprising:
   generating in memory a sparse unary ratings matrix from users' selected preferences, wherein each user's selected preferences are represented as unary data entries in said sparse unary ratings matrix, wherein each unary data entry has a value of either zero or one;
   forming a plurality of data structures representing said sparse unary ratings matrix, wherein the plurality of data structures includes a matrix of co-rates, and wherein the matrix of co-rates includes either a pre-multiplication of the sparse unary ratings matrix by a transpose of the sparse unary ratings matrix or a post-multiplication of the sparse unary ratings matrix by the transpose of the sparse unary ratings matrix;
   forming a runtime recommendation model from said plurality of data structures; and
   determining a recommendation from said runtime recommendation model in response to a request for a recommendation.

28. The method of claim 1, wherein the matrix of co-rates is an item-item matrix of co-rates.

29. The method of claim 1, wherein the matrix of co-rates is a client-client matrix of co-rates.

30. A method of preparing a user recommendation comprising:
   generating, in memory, a sparse unary ratings matrix from users' selected preferences;
   forming in at least one data processing device a plurality of data structures representing said sparse unary ratings matrix, wherein the plurality of data structures includes a matrix of co-rates, and wherein the matrix of co-rates includes either a pre-multiplication of the sparse unary ratings matrix by a transpose of the sparse unary ratings matrix or a post-multiplication of the sparse unary ratings matrix by the transpose of the sparse unary ratings matrix;
   forming in the at least one data processing device a runtime recommendation model from said plurality of data structures;
   determining in the at least one data processing device a recommendation from said runtime recommendation model in response to a request for a recommendation; and
   providing the recommendation in response to the request.

31. The method of claim 30, wherein said forming a runtime recommendation model includes using a formulation:

$$\text{Unary\_Multi\_Vote}(i,j)_{k'}(R_{u,*},k) = \text{TOP}_{k'}(z \in R_{u,*} \Sigma_{(I-I)} M(i,j)^{r(k)}_{z,*})), \text{ and}$$

wherein $\text{TOP}_{k'}$ returns a maximum of k' values of its argument, $_{(I-I)}M = R^t R$, wherein R is the sparse unary ratings matrix, and $R^t$ is the transpose of the sparse unary ratings matrix, $R_{u,*}$ is a row in the sparse unary ratings matrix for client u, $z \in Ru,*$ indicates performing the formulation over a set of values in the row in the sparse unary ratings matrix for client u, and k is a number of neighbors.

32. The method of claim 1, wherein said forming a runtime recommendation model includes using a formulation:

$$\text{Unary\_Multi\_Vote}(i,j)_{k'}(R_{u,*},k) = \text{TOP}_{k'}(z \in R_{u,*} \Sigma_{(I-I)} M(i,j)^{r(k)}_{z,*})), \text{ and}$$

wherein $\text{TOP}_{k'}$ returns a maximum of k' values of its argument, $_{(I-I)}M = R^t R$, R is the sparse unary ratings matrix, $R^t$ is the transpose of the sparse unary ratings matrix, $R_{u,*}$ is a row in the sparse unary ratings matrix for client u, $z \in Ru,*$ indicates performing the formulation over a set of values in the row in the sparse unary ratings matrix for client u, and k is a number of neighbors.

* * * * *